US012145828B2

(12) United States Patent
Walthers

(10) Patent No.: US 12,145,828 B2
(45) Date of Patent: Nov. 19, 2024

(54) SYNCHRONIZED HYBRID CLAMP FORCE CONTROLLER FOR LIFT TRUCK ATTACHMENT

(71) Applicant: Cascade Corporation, Fairview, OR (US)

(72) Inventor: Christopher M. Walthers, Gresham, OR (US)

(73) Assignee: Cascade Corporation, Fairview, OR (US)

( * ) Notice: Subject to any disclaimer, the term of this patent is extended or adjusted under 35 U.S.C. 154(b) by 43 days.

(21) Appl. No.: 18/298,653

(22) Filed: Apr. 11, 2023

(65) Prior Publication Data

US 2023/0242388 A1 Aug. 3, 2023

Related U.S. Application Data

(63) Continuation of application No. 17/349,739, filed on Jun. 16, 2021, now Pat. No. 11,655,130, which is a continuation-in-part of application No. 16/420,000, filed on May 22, 2019, now Pat. No. 11,220,417.

(60) Provisional application No. 63/041,014, filed on Jun. 18, 2020.

(51) Int. Cl.

| | |
|---|---|
| ***B66F 9/22*** | (2006.01) |
| ***F15B 15/20*** | (2006.01) |
| *B66C 1/42* | (2006.01) |
| *B66C 3/16* | (2006.01) |
| *B66F 9/14* | (2006.01) |

(52) U.S. Cl.

CPC ................ *B66F 9/22* (2013.01); *F15B 15/20* (2013.01); *B66C 1/427* (2013.01); *B66C 3/16* (2013.01); *B66F 9/143* (2013.01)

(58) Field of Classification Search

CPC ................ F15B 11/22; F15B 2211/353; F15B 2211/7121; F15B 2211/7114; F15B 11/20; B66F 9/22; B25B 5/062; B25J 13/082

See application file for complete search history.

(56) References Cited

U.S. PATENT DOCUMENTS

| | | | | |
|---|---|---|---|---|
| 2,487,402 | A | 11/1949 | Watson | |
| 3,805,530 | A | 4/1974 | Richardson | |
| 3,990,594 | A | 11/1976 | Olson et al. | |
| 4,427,207 | A | 1/1984 | Gafford | |
| 4,467,894 | A | 8/1984 | Sinclair | |
| 4,866,937 | A | 9/1989 | Leigh-Monstevens | |
| 5,299,685 | A | 4/1994 | Cox et al. | |
| 5,845,223 | A | 12/1998 | Song | |
| 6,502,393 | B1 * | 1/2003 | Stephenson | F16K 31/408 60/424 |

(Continued)

FOREIGN PATENT DOCUMENTS

| | | | |
|---|---|---|---|
| CN | 105217532 | A | 1/2016 |
| CN | 113840793 | A1 | 12/2021 |

(Continued)

OTHER PUBLICATIONS

European Patent Office; Extended European Search Report for EP App. No. 21826543.7; dated Nov. 20, 2023; 8 pages.

*Primary Examiner* — Abiy Teka

(74) *Attorney, Agent, or Firm* — Chernoff, Vilhauer, McClung & Stenzel, LLP

(57) ABSTRACT

A hydraulic control circuit operable to selectively hydraulically link first and second hydraulic actuators and to bypass that hydraulic link.

20 Claims, 14 Drawing Sheets

(56) References Cited

U.S. PATENT DOCUMENTS

| | | | | |
|---|---|---|---|---|
| 10,087,958 | B2 * | 10/2018 | McKernan | F15B 11/22 |
| 10,344,458 | B2 | 7/2019 | Hijikata et al. | |
| 11,220,417 | B2 | 1/2022 | Walthers | |
| 2010/0089704 | A1 | 4/2010 | Petronek | |
| 2010/0122528 | A1 * | 5/2010 | Beschorner | F15B 21/14 60/424 |
| 2018/0066416 | A1 | 3/2018 | Hijikata et al. | |
| 2018/0079634 | A1 | 3/2018 | Petronek | |
| 2018/0170732 | A1 | 6/2018 | Stolten | |
| 2019/0226504 | A1 | 7/2019 | Richter et al. | |
| 2020/0369502 | A1 | 11/2020 | Walthers | |
| 2021/0309502 | A1 | 10/2021 | Walthers | |

FOREIGN PATENT DOCUMENTS

| | | | |
|---|---|---|---|
| DE | 1293033 | B | 4/1969 |
| EP | 3203089 | A1 | 8/2017 |
| EP | 3972928 | | 3/2022 |
| JP | S62-136499 | U | 6/1987 |
| JP | H03-042500 | A | 2/1991 |
| JP | 2000-351591 | A | 12/2000 |
| JP | 2007-298085 | A | 11/2007 |
| JP | 2016-075301 | A | 5/2016 |
| JP | 2022-538734 | A | 9/2022 |
| WO | 2020237179 | A1 | 11/2020 |
| WO | 2021257740 | A1 | 12/2021 |

* cited by examiner

SYNCHRONIZED HYBRID CLAMP FORCE CONTROLLER FOR LIFT TRUCK ATTACHMENT

CROSS REFERENCE TO RELATED APPLICATIONS

This application is a continuation of U.S. patent application Ser. No. 17/349,739 filed on Jun. 16, 2021, which claims the benefit of U.S. Provisional Patent Application No. 63/041,014 filed on Jun. 18, 2020, and U.S. patent application Ser. No. 17/349,739 is a Continuation-in-Part of U.S. patent application Ser. No. 16/420,000 filed on May 22, 2019, now U.S. Pat. No. 11,220,417 issued on Jan. 11, 2022, the contents of which are hereby incorporated by reference in their entireties.

BACKGROUND

The subject matter of this application generally relates to improved systems and methods for operating a lift truck attachment used to grasp and move loads.

Material handling vehicles such as lift trucks are used to pick up and move loads from one location to another. Because lift trucks must typically transport many different types of loads, lift trucks usually include a mast that supports a vertically extensible carriage, which can be selectively interconnected to any one of a variety of different hydraulically operated lift truck attachments, each intended to securely engage and move a specific type of load. For example, a particular lift truck attachment may include a pair of horizontally spaced forks intended to slide into respective slots of a pallet that supports a load to be moved. Another lift truck attachment may include a pair of opposed, vertically-oriented clamps intended to firmly grasp the lateral sides of a load so that the lift truck can raise the load and move it.

Examples of this latter type of attachment include carton clamp attachments intended to grasp boxes or other rectangular loads, paper roll clamps intended to grasp cylindrical loads, etc. Lift truck attachments such as carton or roll clamp attachments need a hydraulic control system designed to avoid damaging the load. As one example, hydraulic control systems for clamp-type attachments need to provide a sufficient lateral force to securely grasp the load so that it does not fall during transport, but at the same time not apply so much force on the load to damage it. Hydraulic control systems for clamp attachments therefore typically include some type of load-weight sensing mechanism along with a control system that regulates gripping force by gradually increasing gripping fluid pressure automatically from a relatively low initial pressure to a pressure just sufficient to allow the load to be raised, without slipping.

However, using a low initial pressure limits the speed with which the load-engaging surfaces can be closed into initial contact with the load, thereby limiting the productivity of the load-clamping system. This problem occurs because high-speed closure requires higher closing pressures than the desired low threshold pressure; such higher pressures become trapped in the system by fluid input check valves during initial closure, so that the desired lower threshold pressure is exceeded before automatic regulation of gripping pressure can begin.

Hydraulic control systems for clamp attachments will also typically coordinate the movement of the clamps towards the load, so that one clamp does not prematurely strike and damage the load, cause the load to skid towards the other clamp, etc. To this end, such control systems typically utilize flow dividers, such as spool and gear flow dividers to split hydraulic fluid evenly to each of the clamps. Spool-type flow dividers split flow through pressure-compensated fixed orifices, which ensures near-equal flow through the orifices, even when inlet and/or outlet pressures fluctuate. However, spool flow dividers must balance accuracy with the ability to tolerate oil contamination without failure. Spool flows dividers are designed to accurately divide flow only within a narrow range of flow rates; because spool dividers use fixed orifices, equal division of flow may not occur when used below the rated flow for a specific divider, and if flow exceeds the rating of the valve, the high pressure drop across the valve causes poor performance and fluid heating. Gear flow dividers, though able to perform over a wider range of operating flow rates than spool dividers, are generally very expensive and the hydraulic circuit must be properly designed to prevent intensification if one clamp is restricted from moving.

Use of flow dividers, such as spool flow dividers and gear flow dividers in hydraulic clamp control systems, also tends to limit the closing speed at which opposed clamps move towards a load. Specifically, as noted earlier, because increasing the inward speed of each clamp requires a higher pressure, and because each clamp is driven towards the load at the same pressure, the clamp force against that load can be quite high when the clamps simultaneously contact the load. Thus, limiting the force against the load, at the instant that two opposed clamps controlled with fluid provided though a flow divider, means limiting the closing pressure and hence the closing speed. To provide high-speed closure and a low initial clamp force, complicated hydraulic control systems may provide high and low relief settings selectable either manually, or automatically in response to clamp closure speed.

What is desired, therefore, is an improved hydraulic control circuit that enables high speed, synchronized closure of opposed clamps towards a load, and that prevents damage to the load upon contact by the clamps.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
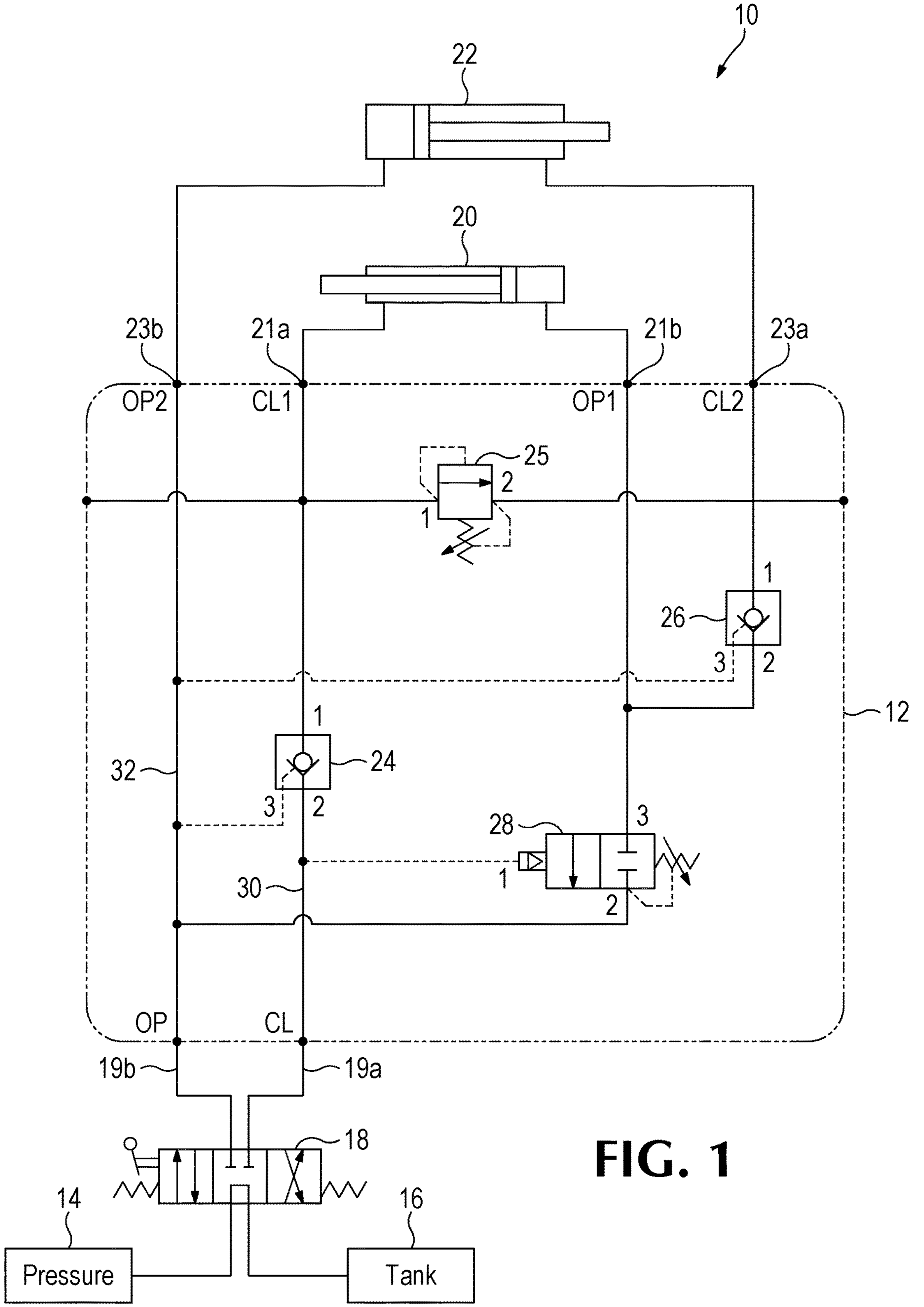
FIG. 1 shows an exemplary hydraulic control circuit that uses fluid provided from a lift truck to operate respective hydraulic cylinders, which may each drive a respective clamp on a lift truck attachment.

The present disclosure describes novel systems and methods that enable hydraulic actuators on industrial equipment, such as a lift truck or a lift truck attachment, to alternate between a first configuration where the actuators are hydraulically linked and a second configuration where the actuators are not hydraulically linked. As used in this specification and in the claims, the term "hydraulic actuator" refers to any device that has first and second fluid line connections, where a difference in fluid pressure across the connections is used to impart motion to the actuator. Examples of hydraulic actuators include, but are not limited to, hydraulic cylinders and hydraulically operated motors. As used in this specification and the claims, when referring to a hydraulic control circuit used to control one or more such actuators, the term "input port" refers to a pair of connections that, in operation of the control circuit, are capable of receiving pressurized fluid from an external source such as a lift truck and thereby pressurizing at least one output port of the control circuit, as later defined, while simultaneously returning unpressurized fluid back to the external source, e.g. lift truck. Similarly, an "output port" as used in the specification and the claims, when referring to a hydraulic control circuit, refers to a pair of connections that, in operation of the control circuit and when both are connected to a hydraulic actuator as previously defined, are capable of delivering fluid pressurized by the input port of the control circuit to the hydraulic actuator, and simultaneously returning fluid from the hydraulic actuator to the control circuit. Also, as used in the specification and the claims, the terms "hydraulically linked," "hydraulically linking," and similar terms, when referring to two or more hydraulic actuators means that the fluid pressure at the discharge side of a first actuator is fluidly communicated to the input side of a second actuator, i.e. the hydraulically linked actuators are connected in series. Furthermore, as used in the specification and claims, the phrase "not hydraulically linked," "not hydraulically linking," and similar terms used with respect to two hydraulic actuators means that the fluid pressure at the discharge side of either actuator is not connected to the input side of the other actuator. Also, as used in this specification, the term "coordinated" when used with respect to two or more hydraulic actuators, hydraulic cylinders, clamps, etc. means that the movement of such elements must occur together, while the term "not coordinated" means that the movement of one hydraulic actuator, hydraulic cylinder, clamp, etc. may occur independently of the other such elements. For purposes of this disclosure, though the specification will refer specifically to hydraulic cylinders, those of ordinary skill in the art will recognize that any fluid power actuator that moves a device to which it is connected by expanding, contracting, rotating, or otherwise moving as a result of a change in fluid pressure through the fluid power actuator may be used in the disclosed systems and methods.

As noted previously, material handling vehicles that grasp and move loads typically alternate between different modes of operation. As one example, a paper roll clamp or a carton clamp will use hydraulic actuators not only to cause clamp arms to apply a force to a load so as to securely lift it, but also will position the clamp arms by either moving together to initially contact the load or moving apart to release the load. In such an application, efficiency is improved if clamp arms are positioned at a high speed and low force, but low speed and high force is desired to avoid damaging the load when clamping it. As another example, some material handling equipment allows a grasped load to be rotated about an axis, thus requiring that clamps rotate to first align with a load, then rotate after a load is grasped. Again, for efficient operation it may be desired to rotate at a high speed, low torque when no load is being grasped, but at a low speed, high torque when a load is being grasped to avoid damaging the load or imparting too much inertia to the vehicle. As yet another example, side-shifting forks often must move independently to provide a desired spacing between the forks, but also move in concert when side-shifting a load held upon the forks.

In each of these illustrative examples, the novel systems and methods disclosed by the present application beneficially allow material handling vehicles, attachments etc. to hydraulically link the actuators during one mode of operation and disengage that hydraulic linkage during another mode of operation. Referring for example to a clamp attachment as described in the preceding paragraph, when coordinating the movement of two clamps toward or away from a load, simultaneously operating hydraulically cylinders or other actuators that move the clamps can be performed at a high-speed of operation, but that high-speed operation risks damaging the load after contact. This risk can be reduced by operating the hydraulic cylinders in series, but this would make the clamps less efficient at grasping the load by reducing the effective cylinder area used to generate clamp force. Thus, one embodiment of the disclosed system and methods hydraulically links cylinders during clamp positioning, i.e. when the clamps are moved outwardly such as to release a load, and/or when the clamps are moved inwardly toward the load so as to clamp it, until a time proximate when the clamps grasp the load, at which point the hydraulic cylinders are no longer linked such that the effective cylinder area is increased and clamp force control can be adjusted more efficiently. Other alternative embodiments of the disclosed systems and methods may hydraulically link the cylinders that move the clamps during an opening movement, and bypass the hydraulic linkage during a closing movement, for example. Those of ordinary skill in the art will appreciate that similar advantages are attained in other types of material handling applications, e.g. side-shifting fork attachments, rotator clamps, etc.

Moreover, such benefits may preferably be attained without the use of flow dividers. As noted previously, existing material handling equipment that engages and moves a load are typically designed to coordinate the motion of clamps, forks, or other such members towards and away from each other using flow dividers. Each such clamp, fork, etc. is typically driven by a respective fluid power actuator, e.g. a hydraulic cylinder, and a flow divider is used to split pressurized flow equally towards each of the hydraulic actuators that move a respective clamp. The flow divider thus ensures that the opposed clamps move in a coordinated manner, toward or away from each other, under essentially identical pressures, but in doing so inhibits the speed at which the clamps move because a low initial pressure is desired when the clamps initially contact the load. The disclosed systems and methods may be used, however, to coordinate the movement of opposed clamps toward and away from each other without passing fluid through a flow divider, by hydraulically linking fluid power actuators that move the clamps.

FIG. 1 shows an exemplary system 10 that includes a hydraulic control circuit 12 that operates hydraulic actuators 20 and 22 using pressurized fluid provided from, e.g. a lift truck or other industrial equipment having a pump or motor 14 and reservoir 16. Preferably, the hydraulic circuit 12 includes an input port having connections 19*a* and 19*b* thus permitting fluid connection to a lift truck or other industrial equipment so that fluid may be provided under pressure to one of the input connections 19*a*, 19*b* while depressurized fluid is returned to the lift truck via the other one of the input connections 19*a*, 19*b*. Those of ordinary skill in the art will understand that during operation of the control circuit 12, each of the connections 19*a* and 19*b* will alternately receive pressurized fluid and expel unpressurized fluid depending on which direction fluid is flowing through the circuit, e.g. whether the cylinders 20, 22 are retracting or extending.

The hydraulic circuit 12 preferably includes a first output port having connections 21*a*, 21*b* and a second output port having connections 23*a*, 23*b*. Each output port is selectively connectable to a respective hydraulic actuator, such as one of the cylinders 20, 22 so that the actuators may be driven in a desired direction or other mode by selecting which connection of a respective output port to pressurize, while allowing fluid thereby expelled from the actuator to return to the circuit 12 from the other connection of the output port. For example, when connection 21*a* is connected to the rod side of cylinder 20 and connection 21*b* is connected to the head side of cylinder 20 as shown in FIG. 1, if output connection 21*a* is pressurized, fluid will flow into the rod-side of cylinder 20 which will then retract, causing fluid to be expelled from the head side of the cylinder 20 back into the circuit 12 through connection 21*b*. Alternately, if output connection 21*b* is pressurized, fluid will flow into the head side of cylinder 20, which will expand and cause fluid to flow from the cylinder 20 back into the circuit 21 through connection 21*a*.

The hydraulic circuit 12 also preferably includes a selector, such as the sequence valve 28 of FIG. 1, which determines whether or not the first output port 21*a*, 21*b* and the second output port 23*a*, 23*b* are operated in series, as explained in detail later in this specification. Those of ordinary skill in the art will appreciate that the specific device or devices used as the selector may vary based on the type or types of hydraulic devices being controlled by the circuit, but broadly however, the selector is a device or arrangement of devices configured in the hydraulic circuit 12 capable of alternatingly selecting whether or not the control circuit 12 interconnects the output ports such that fluid returned from one hydraulic actuator into the control circuit 12 is used to pressurize a connection of the port of another hydraulic actuator. In some embodiments, as later described, the selector may alternatingly select whether connected hydraulic actuators are connected in series to an input port of the control circuit 12, or whether connected hydraulic actuators are connected in parallel to an input port of the control circuit 12. In other embodiments, the selector may select whether connected hydraulic actuators are connected in series to an input port of the control circuit 12, or whether one hydraulic actuator is pressurized by the input port of the control circuit and exhausts fluid towards the input port while another hydraulic actuator is not pressurized by the input port and does not exhaust fluid towards the input port. Regardless of such variations, by selectively determining whether or not hydraulic actuators are linked in series, the control circuit 12 may be used in a variety of different hydraulically operated devices such as lift truck attachments to operate more efficiently.

For example, the embodiment of FIG. 1 shows a circuit 12 used to provide pressurized fluid to a pair of hydraulic cylinders 20 and 22 typical of a carton clamp or roll clamp attachment where retraction of the rods of the cylinders 20 and 22 brings the clamps together and extension of the rods of the cylinders 20 and 22 moves the clamps apart. Opening and closing movement of the cylinders 20 and 22 is manually selectable by direction control valve 18, which when moved to the left from the neutral position shown in FIG. 1 will close the clamps towards the load by providing pressurized fluid to port 19*a* of the control circuit 12 and returning unpressurized fluid to the tank 16 through port 19*b* of the control circuit 12, and when moved to the right from the neutral position shown in FIG. 1 will open the clamps away from the load by providing pressurized fluid to port 19*b* of the control circuit 12 and returning unpressurized fluid to the tank 16 through port 19*a* of the control circuit 12. Typically, the pump or motor 14, the reservoir or tank 16, and the directional control valve 18 are each located on a lift truck that supplies pressurized fluid to a lift truck attachment via fluid lines extending over the mast of the lift truck to the attachment, which in turn would typically include the hydraulic cylinders 20 and 22 along with their associated clamps and the control circuit 12 used to operate the attachment.

When an operator of a lift truck initially moves selector valve 18 to pressurize port 19*a* of control circuit 12, pressurized fluid will flow through pilot operated check valve 24, which is used to maintain the load-gripping force (pressure) in the primary cylinder 20, through output port connection 21*a* and into the rod side of the primary cylinder 20 which will accordingly contract to move it's associated clamp inwardly, e.g. toward a load. Fluid will then be expelled from the head side of the primary cylinder 20 through output port connection 21*b* of the control circuit 12. Because fluid sequence valve 28 (whose operation as the previously-described selector will be explained later) prevents the fluid from returning to the tank 16 through port 19*b*, the fluid expelled from the primary cylinder 20 will flow through pilot-operated check valve 26, through output port connection 23*a* of the control circuit 12, and into the rod-side of secondary cylinder 22, which will also contract to move its associated clamp inwardly, e.g. toward a load. Fluid is then expelled from the head side of secondary cylinder 22 and into output port connection 23*b* to return to the tank 16 via port 19*b* of the control circuit 12. Thus, when sequence valve 28 is maintained in the closed position as shown in FIG. 1, cylinders 20 and 22 are connected in series, and movement of the clamps is coordinated while the clamps are moving inwardly toward a load prior to contacting the load, without using a flow divider, providing an improvement in clamp speed.

When the clamps contact the load, pressure rises in line 30 to which sequence valve 28 is connected. When the pressure reaches a threshold setting of the sequence valve 28, indicating that the load is being clamped, that valve opens to allow fluid to flow from the head side of primary cylinder 20 and into the unpressurized tank 16, and therefore prevents fluid from flowing into the rod side of cylinder 22. As the load is clamped further by primary cylinder 20, secondary cylinder 22 is locked in place; fluid cannot enter the rod side of secondary cylinder 22 to retract the rod since port 3 of pilot valve 26 is depressurized and port 1 is pressurized, while similarly secondary cylinder 22 cannot extend its rod since pilot valve 26 blocks flow out of the rod side of cylinder 22. Thus, sequence valve 28 operates to alternate a mode of operation of the primary and secondary cylinders 20, 22, during a closing movement, between a first mode of operation where the primary and secondary cylinders 20, 22 are hydraulically linked over a first range of motion of the primary cylinder, and a second mode of operation where the primary and secondary cylinders 20, 22 are not hydraulically linked over a second range of motion of the primary cylinder. Though FIG. 1 shows that the sequence valve 28 is operated by a rise in pressure as a load is clamped, those of ordinary skill in the art will recognize that other means may be employed for actuating the sequence valve, or otherwise switching the cylinders 20 and 22 from a first, hydraulically linked mode to a second, non-hydraulically linked mode, such as using a valve actuated when a clamp arm or cylinder expands or retracts beyond a specific location, or using a sensor-operated solenoid valve, etc. In such a manner, for example, the primary and secondary cylinders may switch from being hydraulically linked as clamps reach a location proximate to a load, but not yet contacting it.

When an operator of a lift truck moves selector valve 18 to the right relative to the position shown in FIG. 1, to pressurize port 19*b* of control circuit 12, pressurized fluid will flow to the head side of secondary cylinder 22 to extend its rod. Since port 3 of pilot operated check valve 24, and port 3 of pilot operated check valve 26 are each connected to now-pressurized line 32, which feeds the secondary cylinder 22, each of check valve 24 and check valve 26 will now open, and pressure in line 32 added to the spring force of the sequence valve 28, will cause the sequence valve 28 to close. Thus, as secondary cylinder 22 extends, fluid is expelled from its rod side and through pilot operated check valve 26 to enter the head side of primary cylinder 20, which extends in concert with secondary cylinder 22 and thereby moves the clamps away from each other in a coordinated manner. As the primary cylinder 20 extends, fluid is expelled from its rod side, and through the pilot operated check valve 24 to return to the tank 16.

In this manner, the hydraulic control circuit 12 operates to alternate a mode of operation of the primary and secondary cylinders 20, 22, between a clamp-opening movement where the cylinders 20 and 22 are hydraulically linked, and a clamp closing movement where the cylinders 20 and 22 are not hydraulically linked over at least a portion of the closing movement. Those of ordinary skill in the art will recognize that alternate embodiments may include hydraulic control circuits that have cylinders 20 and 22 linked during the entirely of the opening movements and not linked during the entirety of the closing movement.

Figure 2:
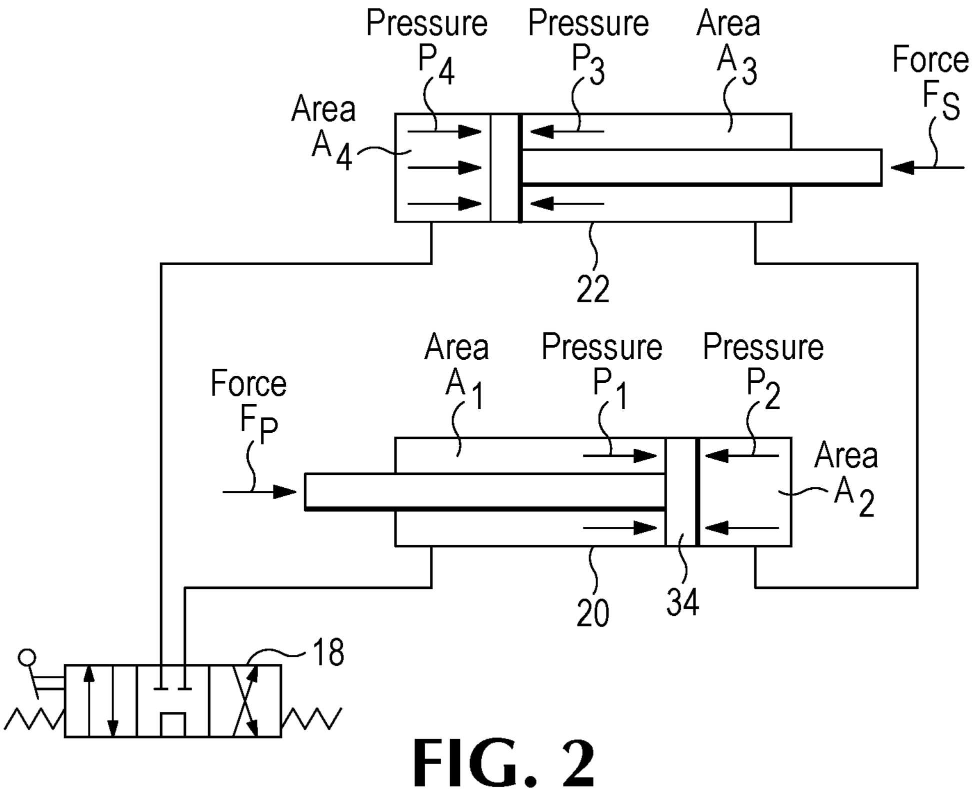
FIG. 2 shows the pressures and forces applied by hydraulic cylinders controlled by the circuit of FIG. 1.

FIG. 2 generally illustrates how pressures and forces are transmitted through the primary and secondary cylinders 20 and 22, and their associated clamps due to the operation of the hydraulic control circuit 12 as previously described. Preferably the rod-side area $A_1$ of the primary cylinder 20 is designed to yield the required load-gripping force at an expected input oil pressure. For example, if the required cylinder force is 4,180 lbs at an input pressure of 2000 psi, the required rod-side area $A_1$ is 2.09 $in^2$. This area can be achieved by using a rod diameter of 1.10 inches (28 mm) and a bore of 1.97 inches (50 mm). The rod-side area $A_3$ of the secondary cylinder 22 is preferably designed to have equal, or near-equal, area to the head-side area $A_2$ of the primary cylinder. This matched area allows for equal movement of each cylinder, i.e. one inch of movement of the rod of the primary cylinder 20 will result in one inch of movement of the rod of the primary cylinder 22. For example, using a primary cylinder 20 with dimensions of 1.10 inches (28 mm) rod diameter and 1.97 inches (50 mm bore diameter), the rod side Area $A_1$ of the primary cylinder is 2.09 $in^2$ and head area $A_2$ is 3.04 $in^2$. The secondary cylinder 22 thus preferably has an equal rod said area $A_3$ of 3.04 $in^2$. Such a cylinder might be constructed with a rod diameter of 1.26 inches (32 mm) and a bore diameter of 2.34 inches (59.4 mm).

As can be determined from FIG. 2, and assuming the rod-side area $A_3$ of the secondary cylinder 22 is equal to the head-side area of the primary cylinder 20, activation of the sequence valve 28 will cause the clamp force against the load $F_P$, $F_S$ to double. Specifically, whether or not the cylinders are hydraulically linked, $F_P$ and $F_S$ must be equal since both forces act against the same immobile load, where in the hydraulically linked case, $F_P$ is equal to $P_1A_1-P_2A_2$ and $F_S$ is simply equal to $P_3A_3$, since $P_4$ is equal to zero as it is connected to the tank pressure. Furthermore, since $A_2$ has been designed to be equal to $A_3$, and given that $P_2$ must equal $P_3$ due to the hydraulic linkage, $P_2A_2$ must be equal to $P_3A_3$. Given these relationships, $$F_P=F_S=P_3A_3=P_2A_2$$

and therefore $$F_P=P_1A_1-P_2A_2=P_1A_1-F_P.$$

Rearranging gives $$F_P=\tfrac{1}{2}P_1A_1.$$

When activation of the sequence valve 28 disables the hydraulic linkage, however, both $P_4$ and $P_2$ become zero since they are connected to the tank, and $$P_3A_3=F_S=F_P=P_1A_1$$

Thus, when the cylinders 20 and 22 are not hydraulically linked, $F_P$ is double the value that it is when the cylinders 20 and 22 are hydraulically linked. Accordingly, by hydraulically linking the cylinders during positioning, movement of clamp arms can be coordinated without the use of flow dividers (which would disadvantageously place restrictions on the inlet flow rate) and can occur at a high speed while minimizing the force on the load when it is initially clamped. Once clamping occurs, the hydraulic linkage of cylinders 20 and 22 can be bypassed, which allows clamp force to be applied more effectively.

Figure 3:
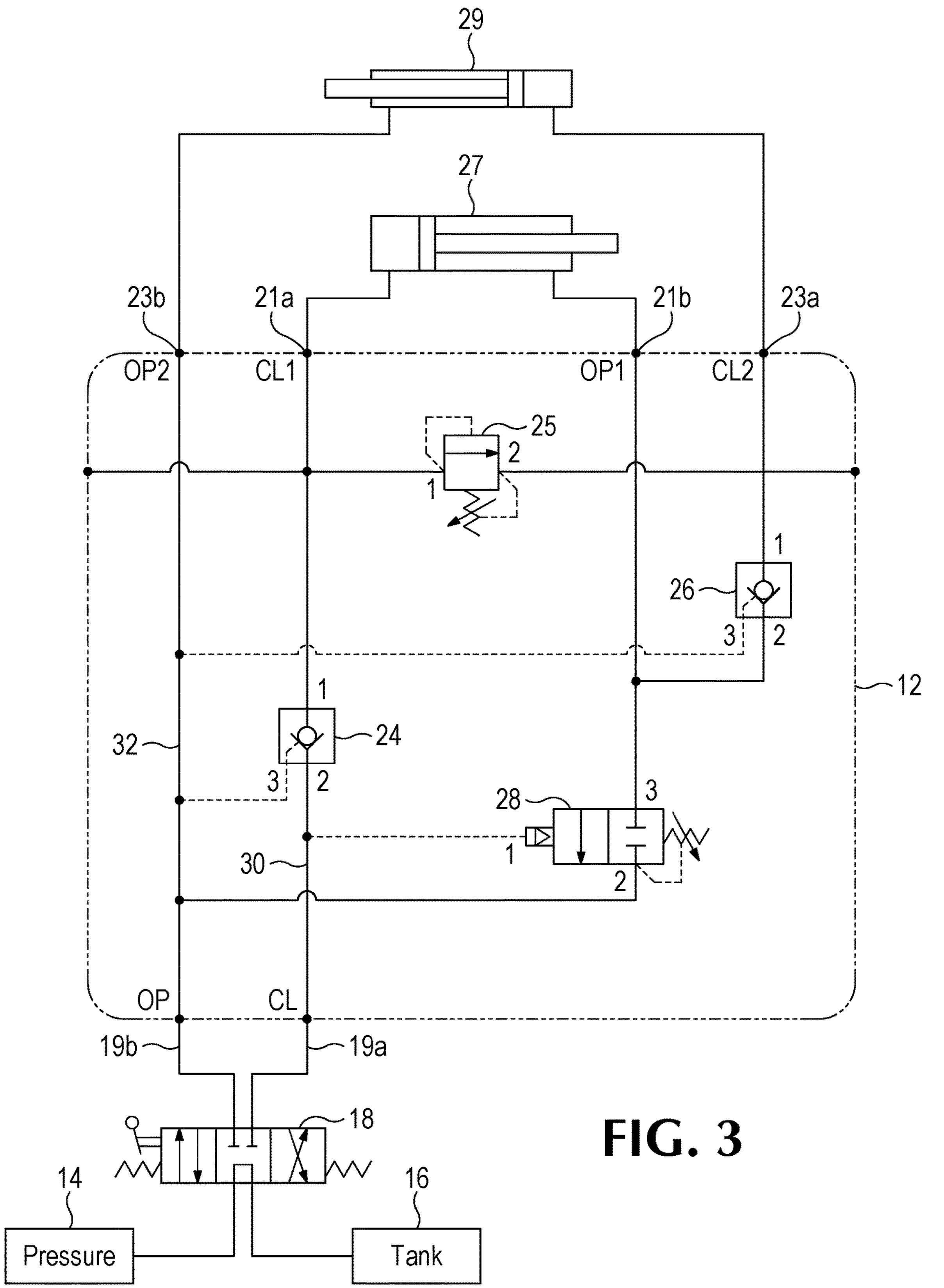
FIG. 3 shows the exemplary hydraulic control circuit of FIG. 1 connected to a pair of hydraulic cylinders used to operate a pivot arm clamp.

FIG. 3 shows an alternate embodiment where the control circuit 12 of FIG. 1 may be used to control hydraulic actuators or cylinders 27, 29 typically found in a pivot arm clamp where the extension of the cylinders 27, 29 provides a gripping force on a load and the retraction of cylinders 27, 29 releases a load. Thus, unlike the embodiment of FIG. 1, the cylinders 27, 29 are connected to the control circuit so that, during clamp closing, pressurized fluid is provided to the head side of primary cylinder 27, and is expelled from the rod-side of cylinder 27, and when hydraulically linked, fluid expelled from the rod-side of cylinder 27 is provided to the head side of cylinder 29, with the rod side of cylinder 29 connected to connection 23*b*, and hence 19*b*. In this embodiment, the head side area of cylinder 29 is preferably equal to the rod side area of cylinder 27 to ensure that, when hydraulically linked, equal movement of the cylinders 27, 29 occurs.

Referring to FIGS. 1 and 3, and as explained earlier, when the sequence valve 28 opens, thereby bypassing the hydraulic linkage between the primary and secondary hydraulic cylinders 20, 22 to further clamp a load, the secondary cylinder 22 in some embodiments may remain stationary while the primary cylinder 20 applies additional clamping force. Due to this asynchronous behavior of the primary and secondary cylinders, continued use of the hydraulic circuit 10 may cause one of the cylinders 20, 22 to reach their end-of-stroke before the other cylinder does, which can inhibit the ability of the system to either adequately clamp the load or retract the clamps to their fully retracted position.

Accordingly, in some embodiments the hydraulic circuit 10 may preferably include an optional resynchronizing valve 25 that allows fluid to bypass the hydraulic linkage when one cylinder has reached its end-of stroke before the other cylinder. When retracting the rods of the cylinders 20, 22, the resynchronizing valve 25 allows oil to flow directly from the pressurized line 30 to the rod-side of the secondary cylinder 22 whenever the pressure difference between the rod-side of the primary cylinder 20 and the rod-side of the secondary cylinder 22 exceeds a threshold amount set by the spring setting of the resynchronizing valve 25. If, for example, the rod of primary cylinder 20 is fully retracted while pressure is provided to clamping port 19*a*, pressure will rise in line 30 until resynchronizing valve 25 opens to allow fluid to flow directly from pressurized line 30 into the rod-side of secondary cylinder 22 which can continue to move to the fully retracted position so as to resynchronize the cylinders 20, 22. Conversely, if the secondary cylinder 22 reaches its end-of-stroke before the primary cylinder 20, pressure will increase in line 30 until the pressure setting value of the sequencing valve 28 is reached, and oil is allowed to be exhausted from the head side of primary cylinder 20 until both cylinders are fully synchronized.

The spring setting of the resynchronizing valve 25 should be sufficiently high to both ensure that the sequence valve 28 opens before the resynchronizing valve 25 opens, and to otherwise prevent the valve 25 from opening when the cylinders 20, 22 are hydraulically linked while being positioned toward a load prior to clamping it. In that instance, since the head-side of the primary cylinder 20 is connected to the rod-side of the secondary cylinder 22, the pressure setting of the spring of valve 25 should be set to a value higher than the highest anticipated pressure drop across the primary cylinder 20 during positioning, which in turn is related to the maximum intended positioning speed of the valve circuit 10. When the primary cylinder 20 and the secondary cylinder 22 are clamping on a load, whether or not the cylinders 20 and 22 are hydraulically linked, and so long as the primary cylinder is not at the end-of-stroke, the pressure in the rod-sides of both cylinders will be the same, and any spring setting of the valve 25 that satisfies the above conditions would thus always keep the valve closed. In a preferred embodiment, the spring setting of the resynchronizing valve 25 may preferably be set to about 150 psi lower than the system pressure setting.

Those of ordinary skill in the art will appreciate that the resynchronizing valve 25, configured to resynchronize cylinders 20 and 22 by moving the rods of both cylinders to the fully retracted position, may instead be configured to resynchronize cylinders 20 and 22 by moving the rods of both cylinders to the fully extended position, by e.g. connecting the input of the resynchronizing valve 25 to line 32 instead of line 30, and connecting the output of the resynchronizing valve 25 to the head side of primary cylinder 20 instead of the rod side of secondary cylinder 22.

Figure 4:
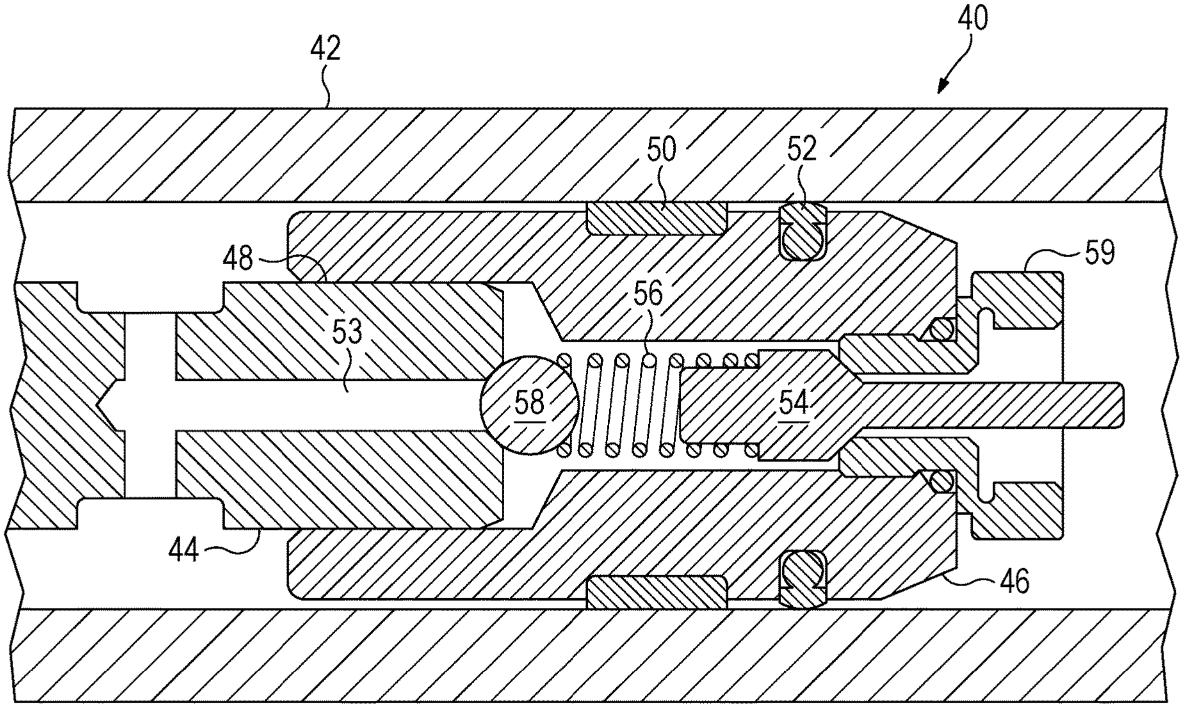
FIG. 4 shows a first exemplary synchronizing plunger that may be used in the hydraulic control circuit of FIG. 1.

As an alternative to using resynchronizing valve 25, one or both of the primary and secondary cylinders 20, 22 may be configured to selectively operate as a valve that allows resynchronization by allowing oil to flow from the rod-side to the head side of the cylinder, or vice versa, when the cylinder has reached an end-of-stroke position. Referring to FIG. 4 for example, either or both the primary or secondary cylinders 20 or 22 may comprise a synchronizing cylinder 40 having a cylinder shell 42 that encloses at least a portion of a sliding cylinder rod 44, which is fixed in a threaded bore 48 of a sliding piston 46. The piston 46 preferably includes a wear band 50 and a piston seal 52 to provide for sealed, sliding movement of the piston within the cylinder shell 42. The cylinder rod 44 may define a conduit for pressurized oil to flow back and forth between the rod-side area of the cylinder 40 (i.e. area $A_1$ or $A_3$ of FIG. 2) to the interior of the piston 46. For example, the cylinder rod 44 may include a conduit 53 comprising a passage with a first portion that extends axially inwards from the end of the rod 44 embedded in the piston 46 to a second portion that includes a plurality of radial passages to the periphery of the cylinder rod 44. The piston-side of the conduit 53 may be selectively sealed by a check ball 58 mounted on a spring 56 that pushes the check ball 58 toward the first, axial portion of the conduit 53. The end of the spring 56 opposite the check ball 58 is in turn secured around a flange of a sliding plunger 54. The flange of the plunger 54 fits within a seat of a retainer 59 such that oil within the interior of the piston 46 is sealed from entering the head side area of the cylinder 40 (i.e. Area $A_2$ or $A_4$ of FIG. 2), or flowing in the opposite direction, when the flange of the plunger 54 rests in the seat of the retainer 59.

Figure 5A:
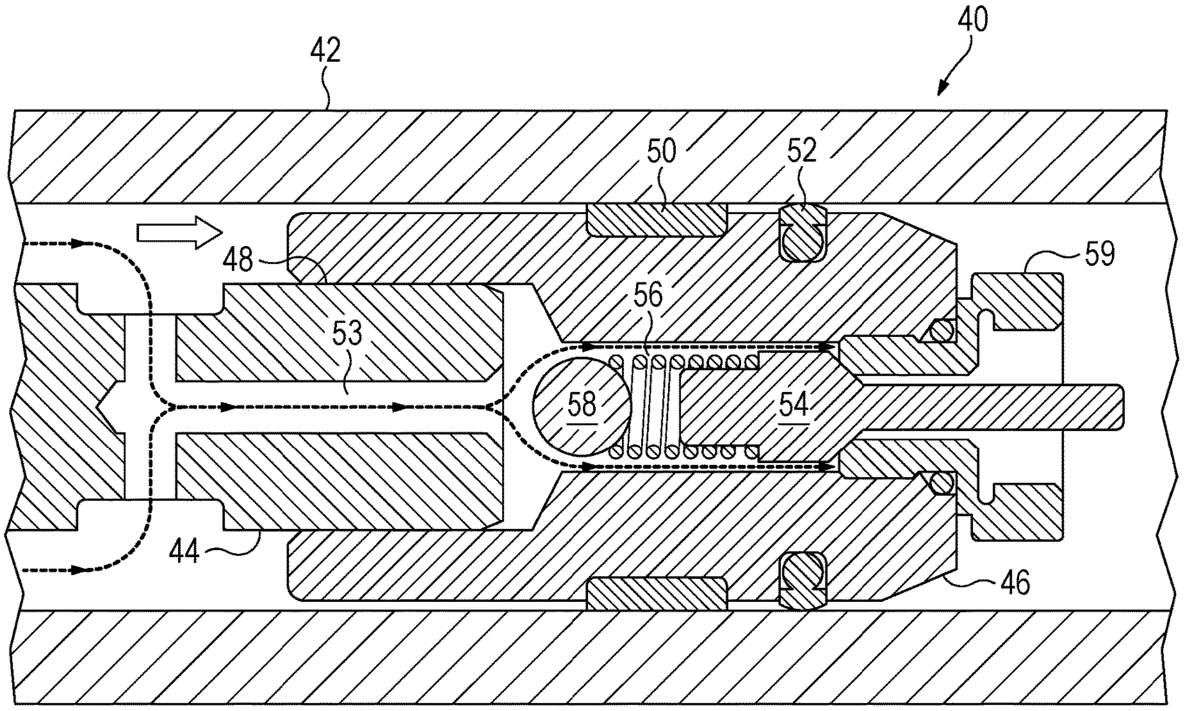
FIG. 5A shows the synchronizing plunger of FIG. 3 in a mid-stroke position and pressurized from the rod side.
Figure 5B:
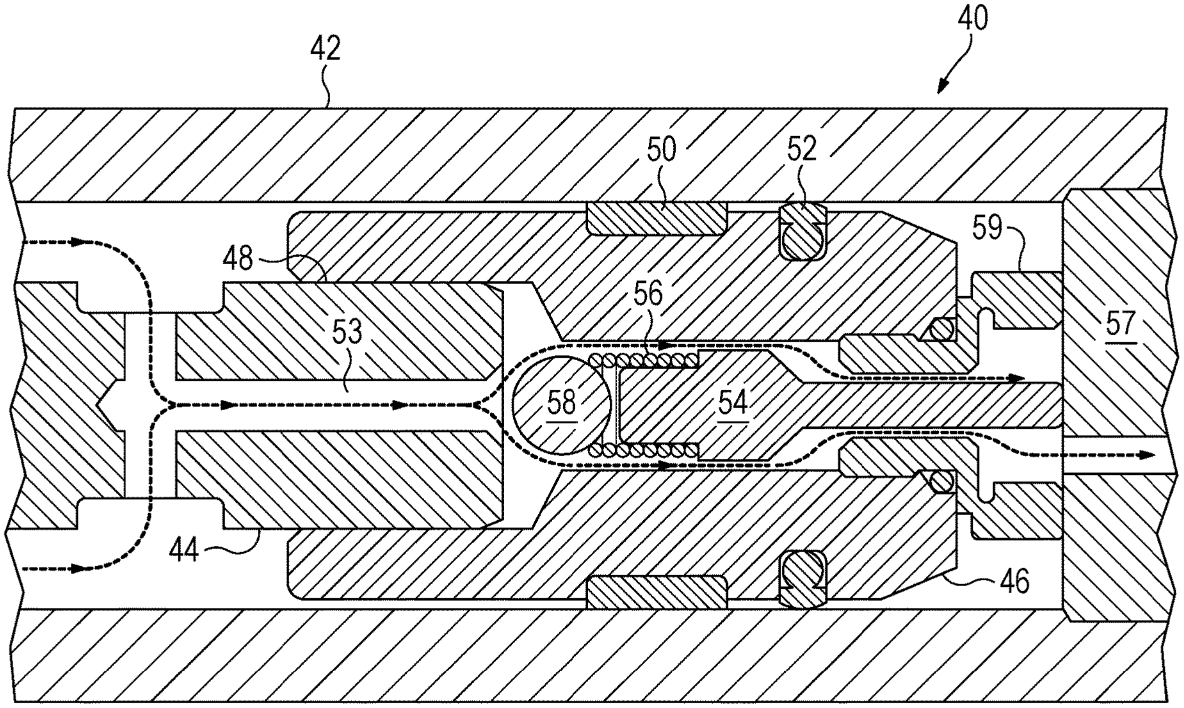
FIG. 5B shows the synchronizing plunger of FIG. 3 in an end-of-stroke position and pressurized from the rod side.
Figure 5C:
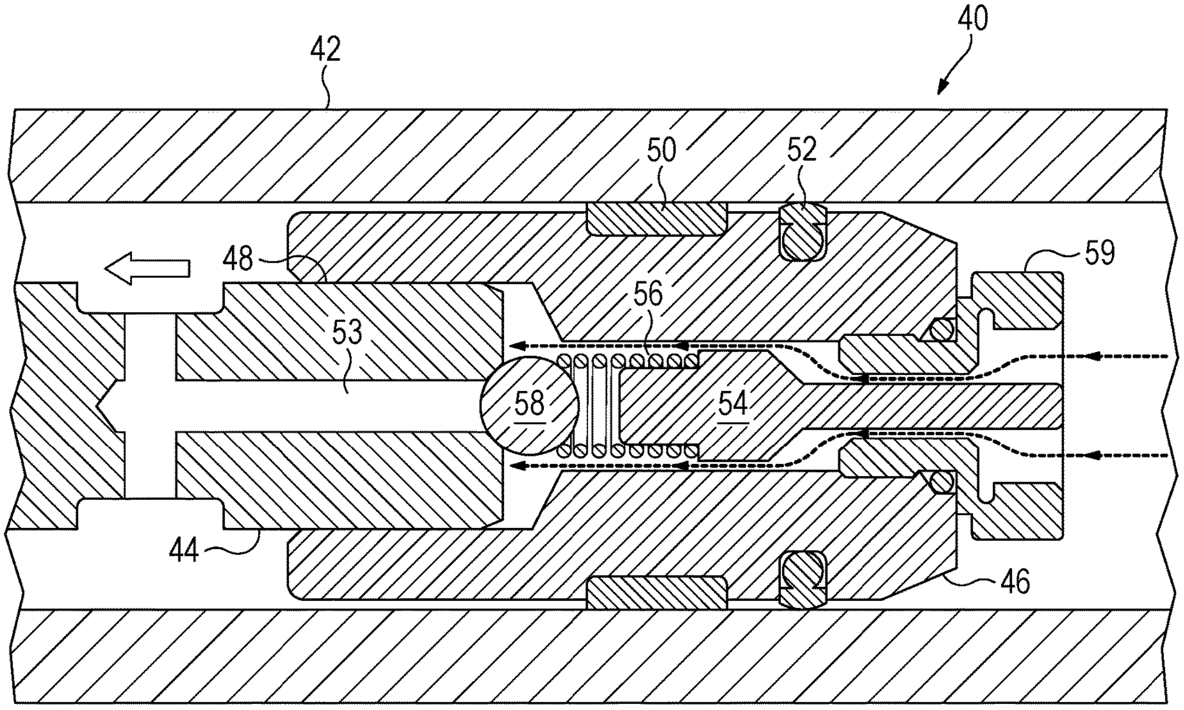
FIG. 5C shows the synchronizing plunger of FIG. 3 in a mid-stroke position and pressurized from the head side.

Referring to FIG. 5A, when the cylinder 40 is pressurized from the rod-side so as to retract the rod, and is not at an end-of-stroke position, pressurized oil flows from the rod-side area of the cylinder 40, through the radial portion and then the axial portion of passage 52 to push the check ball 58 inwards and allow oil to reach the interior cavity of the piston 46. But the spring 56 pushes the plunger 54 against the seat of the retainer 59, thus preventing oil from flowing into the head-side area of the cylinder 40. When, however, the cylinder 40 retracts the rod a sufficient distance to reaches the rod's end of stroke position, as seen in FIG. 5B, the plunger 54 contacts cylinder head 57 which compresses the spring 56 between the flange of the plunger 54 and the unseated check ball 58, such that the plunger 54 comes off of the seat of the retainer 59 and oil is allowed to flow from rod-side area of the cylinder 40, to the interior of the piston 46, and out to the head side area of the cylinder 40, and ultimately to the other cylinder 20 or 22 (or the tank 16) via porting 55, to allow resynchronization. As shown in FIG. 5C, when cylinder 40 is pressurized from the head side, in a mid-stroke position, pressurized oil pushes the plunger 54 off the seat of the retainer 59 and allows oil to flow into the interior of the piston 46, but the plunger 54 causes the spring 56 to push the check ball 58 to seal the conduit 53 so that oil may not flow to the rod-side area of the cylinder 40.

Figure 6:
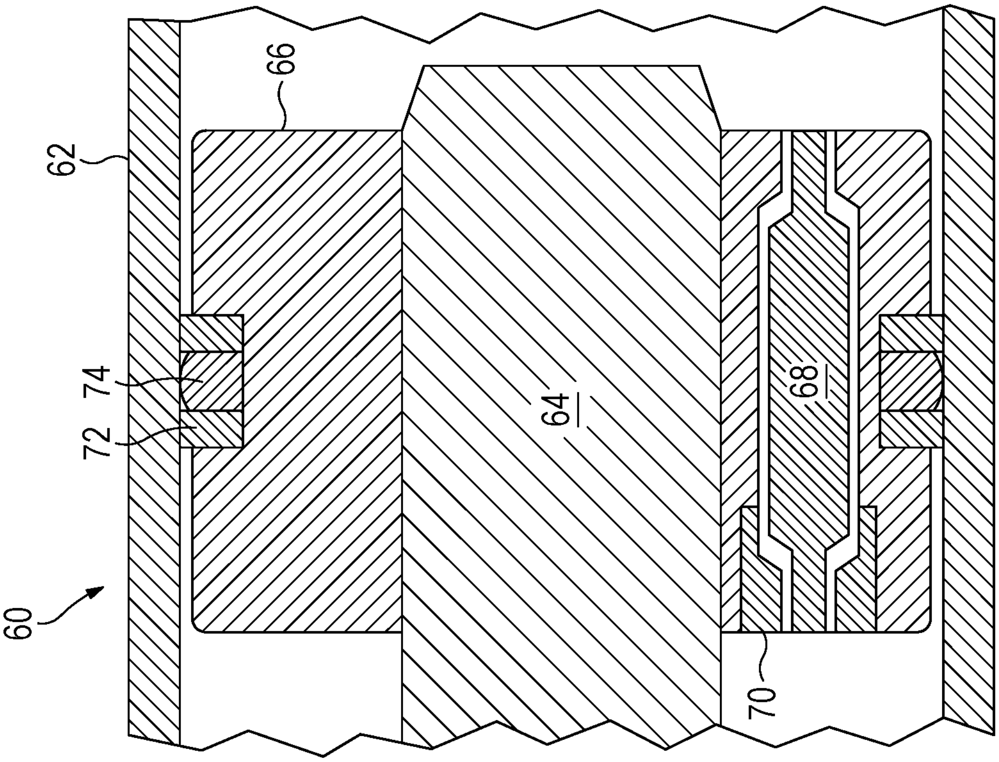
FIG. 6 shows a second exemplary synchronizing plunger that may be used in the hydraulic control circuit of FIG. 1.

FIG. 6 shows an alternate synchronizing cylinder 60 capable of resynchronizing at either the fully retracted or fully extended end-of-stroke position of the rod of the cylinder 60. Specifically, cylinder 60 may comprise a cylinder shell 62 within which a piston 66 is slidably and sealably secured via seal 74 and one or more wear bands 72. Rigidly mounted within a first bore 65 of the piston 66, by e.g., a heat shrink connection, is the end of a cylinder rod 64 that slides with the piston 66. The piston 66 also defines a second bore 67 that houses a spool 68 that generally matches the shape of the second bore 67, such that a gap is defined between the outer surface of the spool 68 and the inner surface of the second bore 67. Both the second bore 67 and the spool 68 have a central region with a larger diameter/width than opposed peripheral regions of the second bore 67 and the spool 68, respectively, where the central region of the spool 68 has a shorter length than that of the second bore 67, and where the second bore 67 and the spool 68 are jointly shaped such that the central region of the spool 68 may slide back and forth within the central region of the second bore 67 between a first extreme where one peripheral region of the spool 68 extends out of the associated peripheral region of the second bore 67 and a second extreme where the opposed peripheral region of the spool 68 extends out of its associated peripheral region of the second bore 67. In some embodiments, to facilitate the formation of a second bore 67 shaped to closely surround the spool 68, the second bore 67 may be formed on one end using a retainer plug 70 secured within the piston 66 with a heat shrink connection, so as to surround one peripheral region of the spool 68.

Figure 7A:
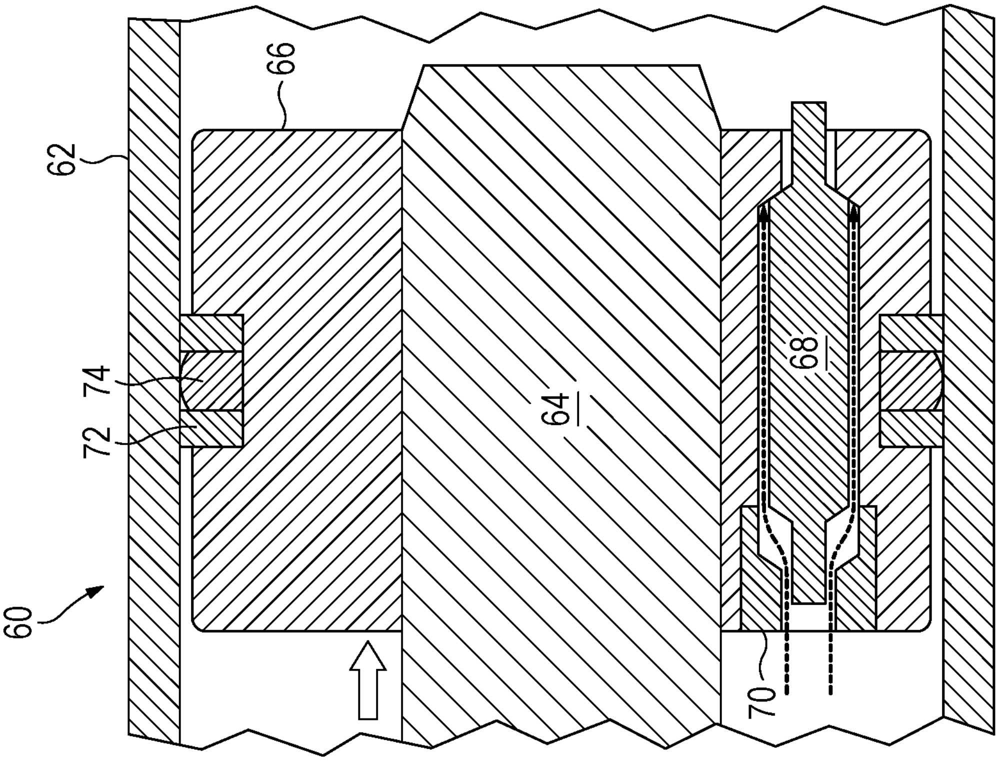
FIG. 7A shows the synchronizing plunger of FIG. 5 in a mid-stroke position and pressurized from the rod side.

Referring to FIG. 7A, when the cylinder 60 is pressurized from the rod-side, spool 68 is pushed within the second bore 67 to allow oil to flow through the gap between the second bore 67 and the rod-side of the spool 68, but oil is blocked from entry into the head side of the cylinder 60 because the spool 68 is pushed into, and closes, the head-side peripheral region of the second bore 67. When, however, the retracting rod reaches the end-of-stroke position shown in FIG. 7B, cylinder head 76 pushes spool 67 inward such that pressurized oil can enter the head-side peripheral region of the second bore 67 and escape to the other cylinder 50 or 52, or the tank 16 via porting 78.

Figure 7C:
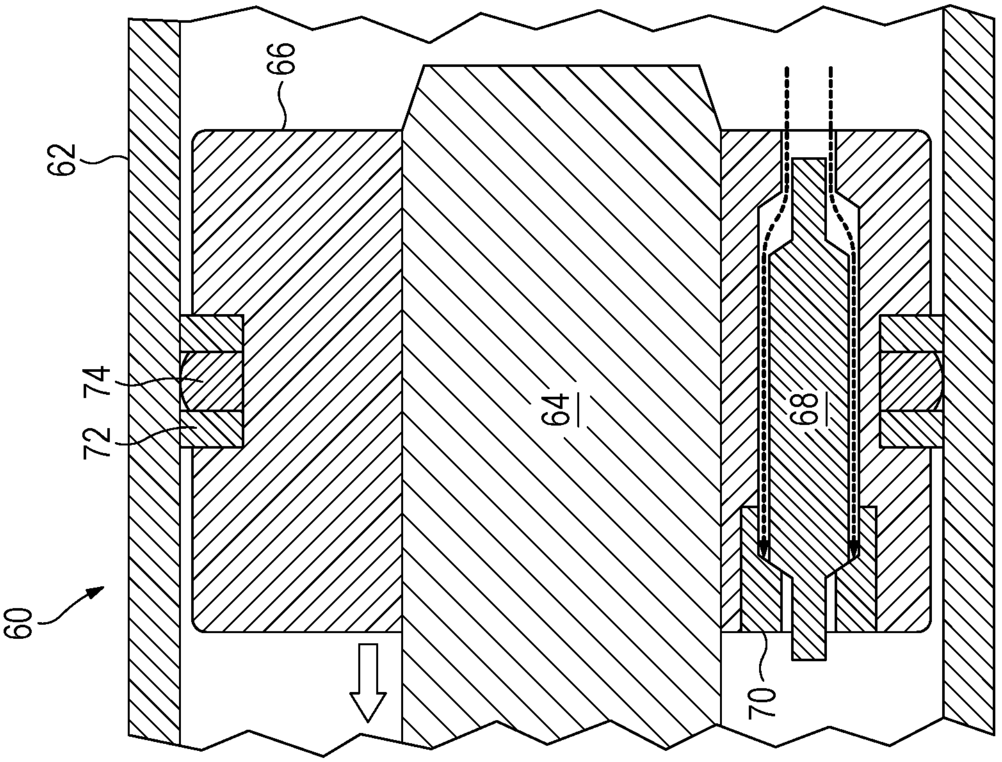
FIG. 7C shows the synchronizing plunger of FIG. 5 in a mid-stroke position and pressurized from the head side.
Figure 7B:
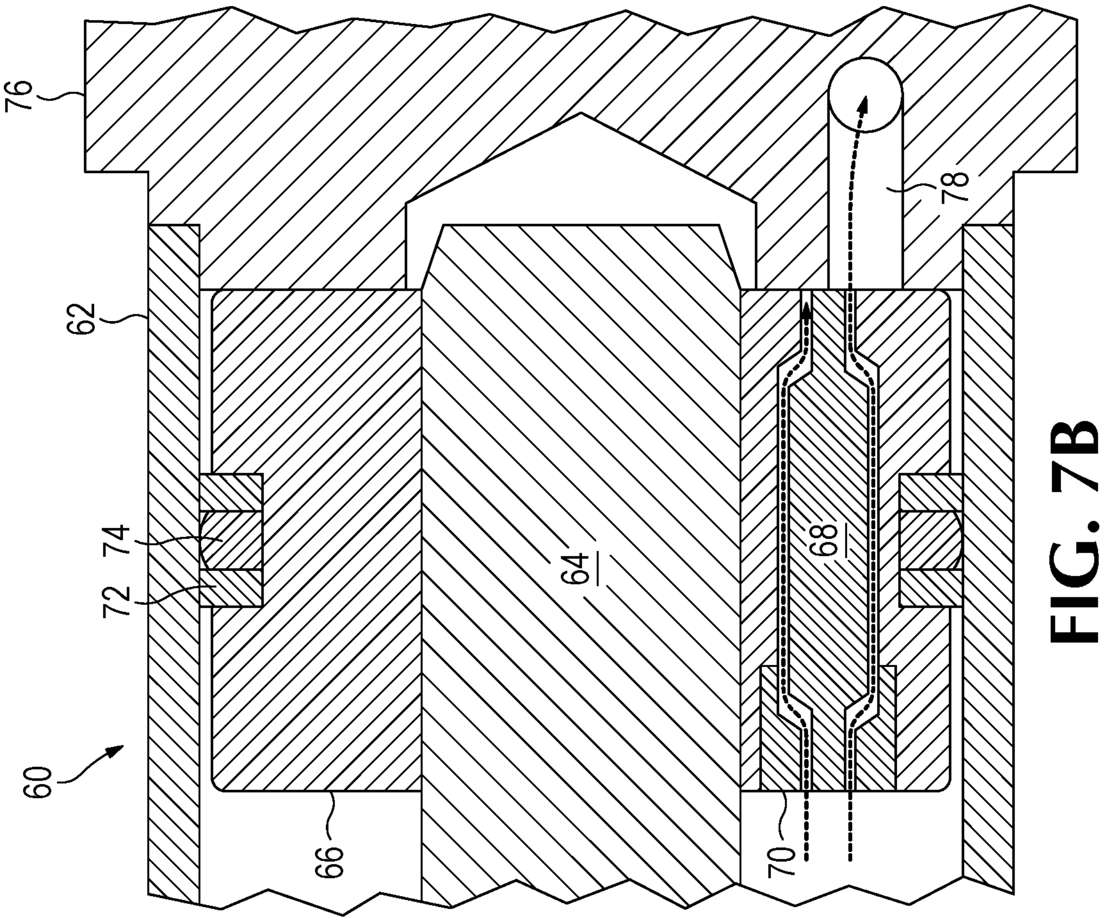
FIG. 7B shows the synchronizing plunger of FIG. 5 in an end-of-stroke position and pressurized from the rod side.
Figure 7D:
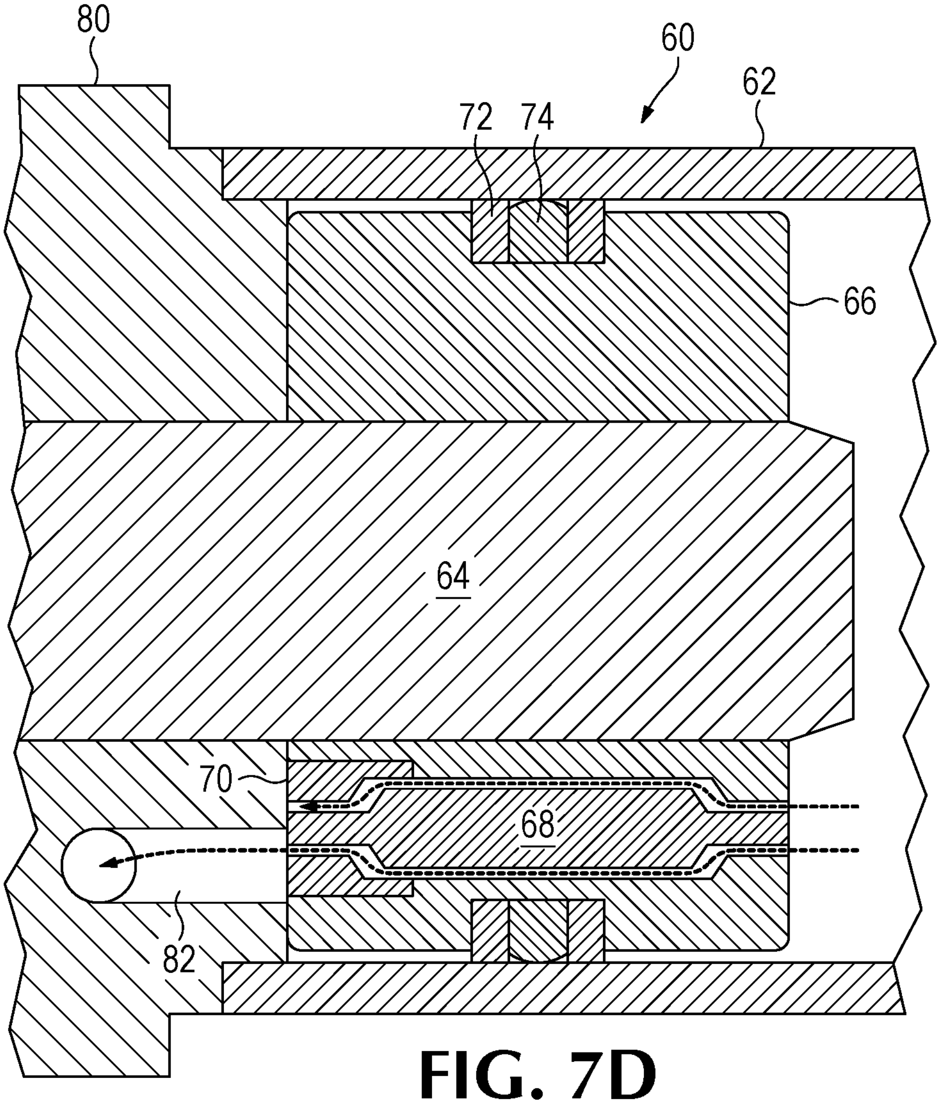
FIG. 7D shows the synchronizing plunger of FIG. 5 in an end-of-stroke position and pressurized from the head side.

As can be seen in FIGS. 7C and 7D, this operation reverses when the cylinder 60 is pressurized from the head side; during a mid-stroke position, the spool 68 slides so as to allow oil to flow from the head side of the cylinder 60 and into the area between the spool 68 and the second bore 67, but blocks oil from entering the rod-side area of the cylinder 60. When the extending rod 64 reaches the end-of-stroke position, cylinder retainer 80 pushes spool 67 inward such that pressurized oil can enter the rod-side peripheral region of the second bore 67 and escape to the other cylinder 50 or 52, or the tank 16 via porting 82.

Figure 8:
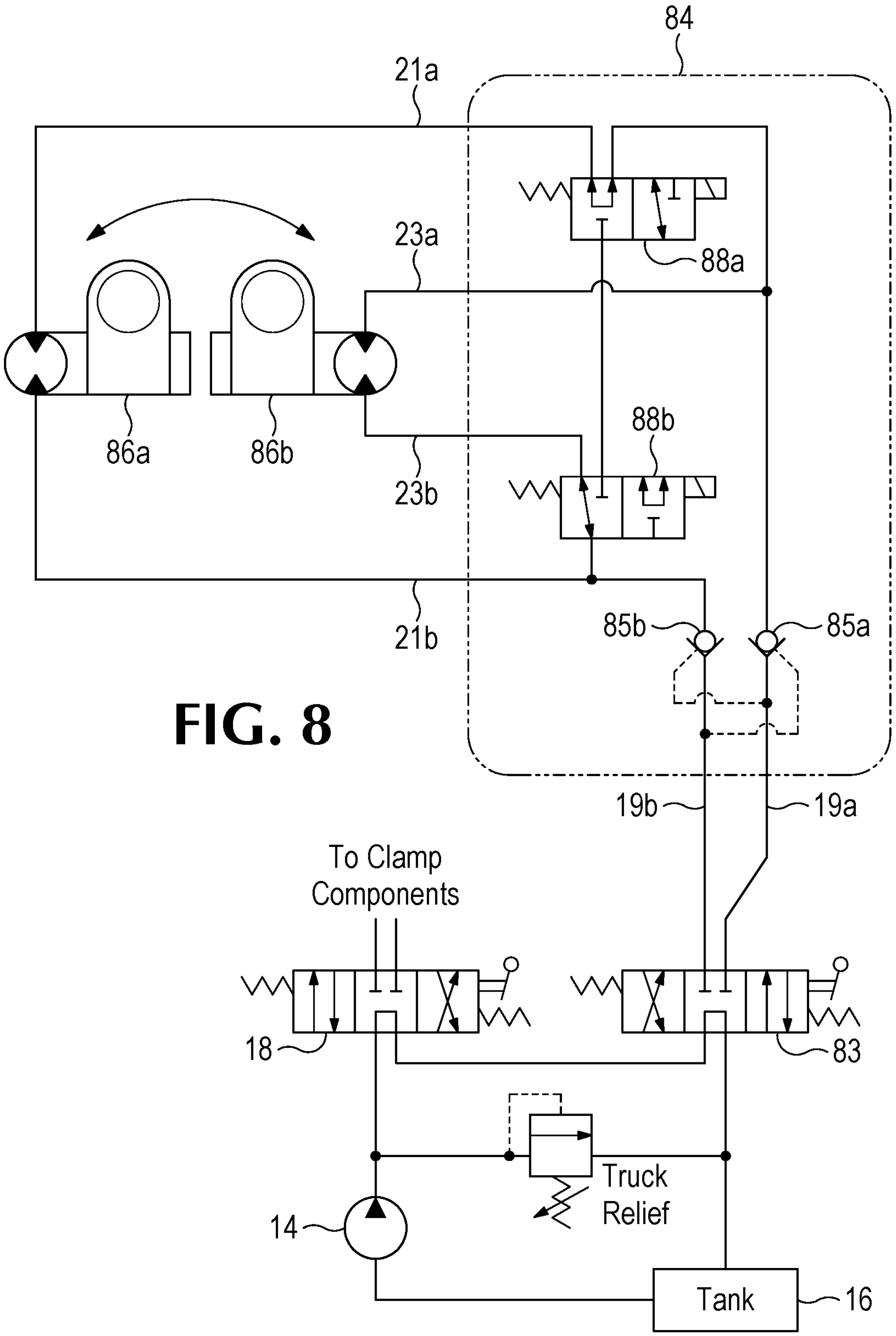
FIG. 8 shows an alternate control circuit used to control respective hydraulically operated motors of a lift truck attachment.

The embodiments shown in FIGS. 1 and 3 use a control circuit 12 intended to operate hydraulic actuators alternately in a first mode where the hydraulic actuators are connected in series so as to move in a coordinated manner, and a second mode where the movement of the hydraulic actuators is not coordinated, e.g. one hydraulic actuator is locked in place while the other moves. FIG. 8 shows an alternate control circuit 84 for a rotator dual drive motor where the control circuit 84 includes a selector 88*a*, 88*b* capable of alternately driving two hydraulic motors 86*a*, 86*b* in series or in parallel where the movement of the motors is coordinated in both instances. Specifically, the control circuit 84 may include an input port 19*a*, 19*b* selectively connectable to a pump 14 and reservoir 16 on, for example, a lift truck having both a clamp selector valve 18 intended to alternately clamp and release a load as previously described, as well as a rotator selector valve 83 used to selectively rotate the clamps about an axis in a desired direction by moving the valve to the left or right of a centered position, or hold the angular orientation of the clamps fixed by moving the valve 83 to the centered position.

The control circuit 84 preferably has a first output port with connections 21*a*, 21*b* and a second output port with connections 23*a*, 23*b* each selectively connectable to a respective one of hydraulic motors 86*a*, 86*b*. Thus, when connected as shown in FIG. 8, motor 86*a* may be driven in one direction by pressurizing connection 21*a* and allowing fluid to exhaust from the motor back into the control circuit 84 through connection 21*b*, and may be driven in the opposite direction by pressurizing connection 21*b* and allowing fluid to exhaust from the motor back into the control circuit 84 through connection 21*a*. Motor 86*b* may be similarly driven via connections 23*a* and 32*b*.

The control circuit 84 preferably has a selector, shown in this example as comprising first and second solenoid valves 88*a*, 88*b*, and used to determine whether pressurized fluid received through the input port 19*a*, 19*b* drives the motors 86*a*, 86*b* in series (useful, for example, to rotate clamps at a high speed when no load is grasped) or in parallel (useful, for example, to rotate clamps at a low speed but high torque when a load is grasped). Specifically, when the solenoids 88*a*, 88*b* are each in an un-energized state, pressurized fluid present at either of the input port connections will drive the motors 86*a*, 86*b* in parallel by routing fluid pressurized from the pump 14 to connections 21*a* and 23*a* when input connection 19*a* is pressurized and routing fluid pressurized from the pump 14 to connections 21*b* and 23*b* when input connection 19*b* is pressurized. In both circumstances, each of the non-pressurized output connections to the motors 86*a* and 86*b* are independently connected to the reservoir 16, allowing the motors to exhaust fluid directly towards the reservoir 16.

When both solenoids are energized, however, connection 23*b* of the control circuit's output port to the motor 86*b* is connected to connection 21*a* of the control circuit's output port to the motor 86*a*, so as to rotate the motors 86*a*, 86*b* in series. In this configuration, when connection 19*a* is pressurized by the pump 14, pressurized fluid flows out of connection 23*a* and into motor 86*b*, which expels fluid back into connection 23*b* and through connection 21*a* to motor 86*a*. Fluid from motor 86*a* flows back into the control circuit 84 through connection 21*b*, and from the control circuit 84 out to the tank 16 through input connection 19*b*. Pressurizing connection 19*b* while both solenoids are energized, conversely, maintains the serial connection of the motors 86*a*, 86*b* but rotates them in the other direction relative to the rotation that occurs when connection 19*a* is pressurized. Those of ordinary skill in the art will appreciate that, although FIG. 8 shows two solenoids 88*a*, 88*b* as the selector that alternates the control circuit 84 between a parallel configuration and a serial configuration, other embodiments may use different selectors, e.g. pilot controlled valves that change configuration based on a detected clamping pressure.

Figure 9:
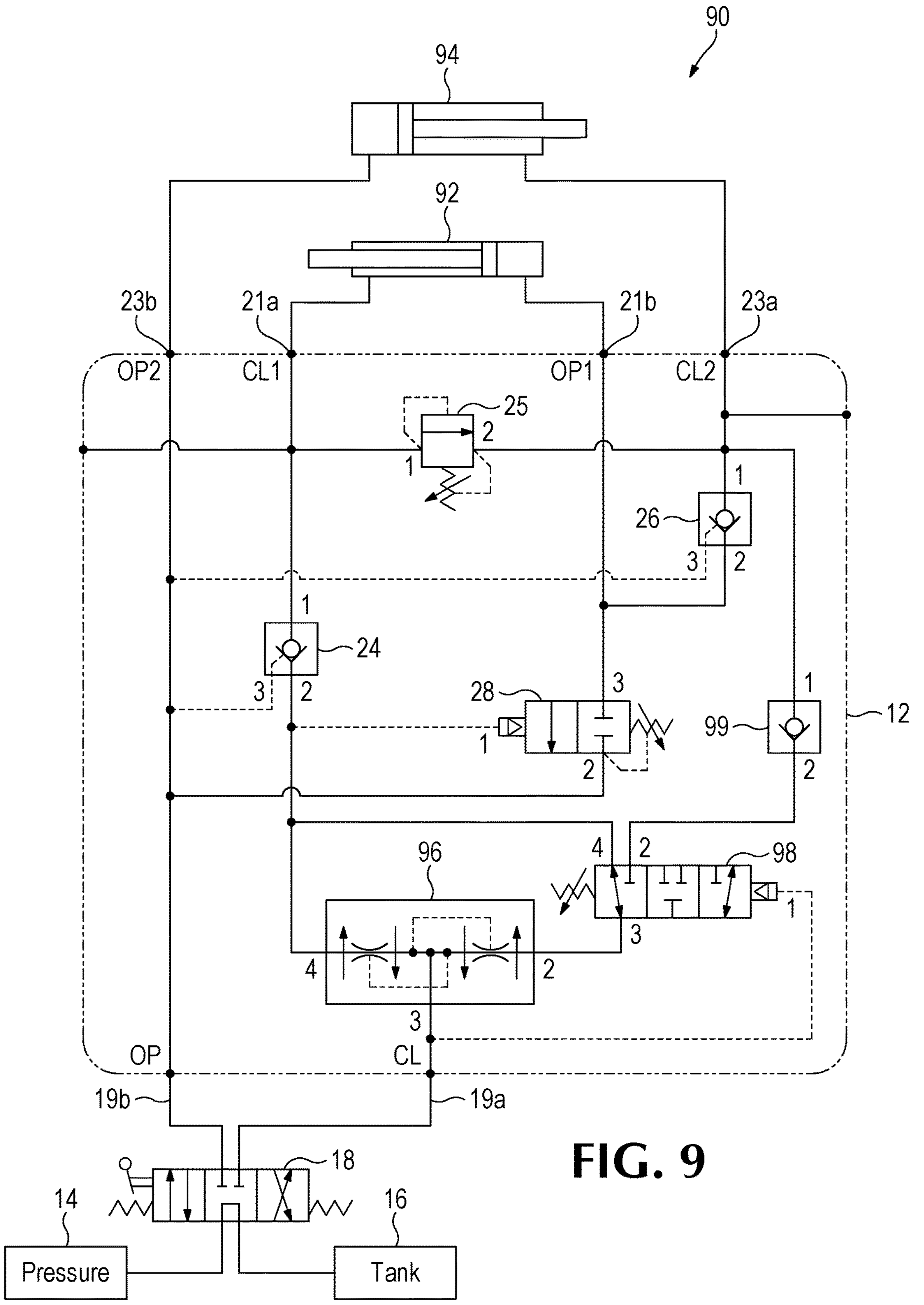
FIG. 9 shows an alternate control circuit capable of coordinating the movement of hydraulic actuators while such actuators are either linked or not linked.

FIG. 9. shows yet another embodiment of a control circuit that coordinates the movement of hydraulic actuators in a selectively alternating one of a series configuration and a parallel configuration. Specifically, a hydraulic control circuit is used to coordinate the movement of hydraulic cylinders 92, 94 that for example, respectively move clamps towards and away from a load using pressurized fluid provided to connections 19*a*, 19*b* of an input port of the hydraulic control circuit. As can be seen from FIG. 9, the control circuit 90 includes all the elements of control circuit 12 shown in FIGS. 1 and 3, but also includes a flow divider 96 and a pressure-actuated valve 98 interposed between connection 19*a* of the input port to the control circuit 90.

When pressurized fluid is provided to connection 19*b* of the input port of the control circuit 90, the control circuit 90 operates in the same manner as control circuit 12 of FIG. 1; cylinders 92 and 94 are connected in series so as to extend the rods of the cylinders in a coordinated manner, where fluid flows from the control circuit 90 into the head side of cylinder 94, back from the rod side of cylinder 94 into the control circuit 90, into the head side of cylinder 92 from the control circuit 90, and out from the rod side of cylinder 92 back into the control circuit which in turn discharges fluid into the tank 16. However, when pressurized fluid is provided to connection 19*a* of the input port of the control circuit 90, that pressurized fluid is distributed by flow divider 96 in a manner determined by the position of pressure-actuated valve 98. Specifically, the flow divider 96 splits fluid provided from connection 19*a* into a first path or line toward connection 21*a* connected to the rod-side of cylinder 92 and a second path or line toward the pressure-actuated valve 98. The pressure-actuated valve 98 is spring-biased to a position that re-combines the flows split by the flow divider 96 so that the entire flow pressurizes port 21*a*, which again causes the control circuit to behave exactly as does control circuit 12 of FIG. 1, i.e. cylinders 92 and 94 are connected in series so as to position clamps in a closing movement towards a load in a coordinated manner. When the clamps contact the load, pressure at port 19*a* increases to a level that moves pressure-actuated valve 98 so as to divert fluid from the second path, as just described, through a one-way check valve 99, and to the rod-side of cylinder 94 so that pressure provided through input port connection 19*a* of the control circuit 90 operates cylinders 92 and 94 in parallel as a load is being clamped.

Because the coordinated operation of the cylinders 92 and 94, when hydraulically linked in series with each other, requires that the head side area of cylinder 92 match the rod side area of cylinder 94, the rod-side area of cylinder 92 would typically be smaller than the rod-side area of cylinder 94. Thus, in order to equalize the force applied by the cylinders 92 and 94 and to coordinate the movement of the cylinders 92 and 94 when they are not hydraulically linked and controlled in parallel, the flow divider 96 preferably splits the flow from input connection 19*a* unevenly, in an amount proportional to the rod-side area of the cylinders driven by the respectively split fluid flow. Thus, in the illustrative example of FIG. 9, where cylinder 92 has a rod-side area of 2.09 $in^2$ and cylinder 94 has a rod-side area of 3.04 $in^2$ for a total area of 5.13 $in^2$, the flow divider 96 preferably directs 41% of the flow into cylinder 92 (i.e. 2.09 $in^2/5.13\ in^2$) and 59% of the flow into cylinder 94 (i.e. 3.04 $in^2/5.13\ in^2$) when clamping on a load. This ensures that the flow into the cylinders 92 and 94 each causes the same linear retraction of the rod in each respective cylinder.

One advantage of the control circuit 90 in comparison to the control circuit 12, when used to operate clamps on a load, is that the control circuit 90 may reduce or possibly eliminate the need for the re-synchronizing valve 25 or the use of valves in hydraulic cylinders such as those shown in FIGS. 4 and 6. Because the cylinders 92 and 94 move in concert both during positioning of the clamps and while the load is being clamped, each of cylinders 90 and 92 are much less likely to reach an end-of-stroke before the other cylinder does.

Figure 10:
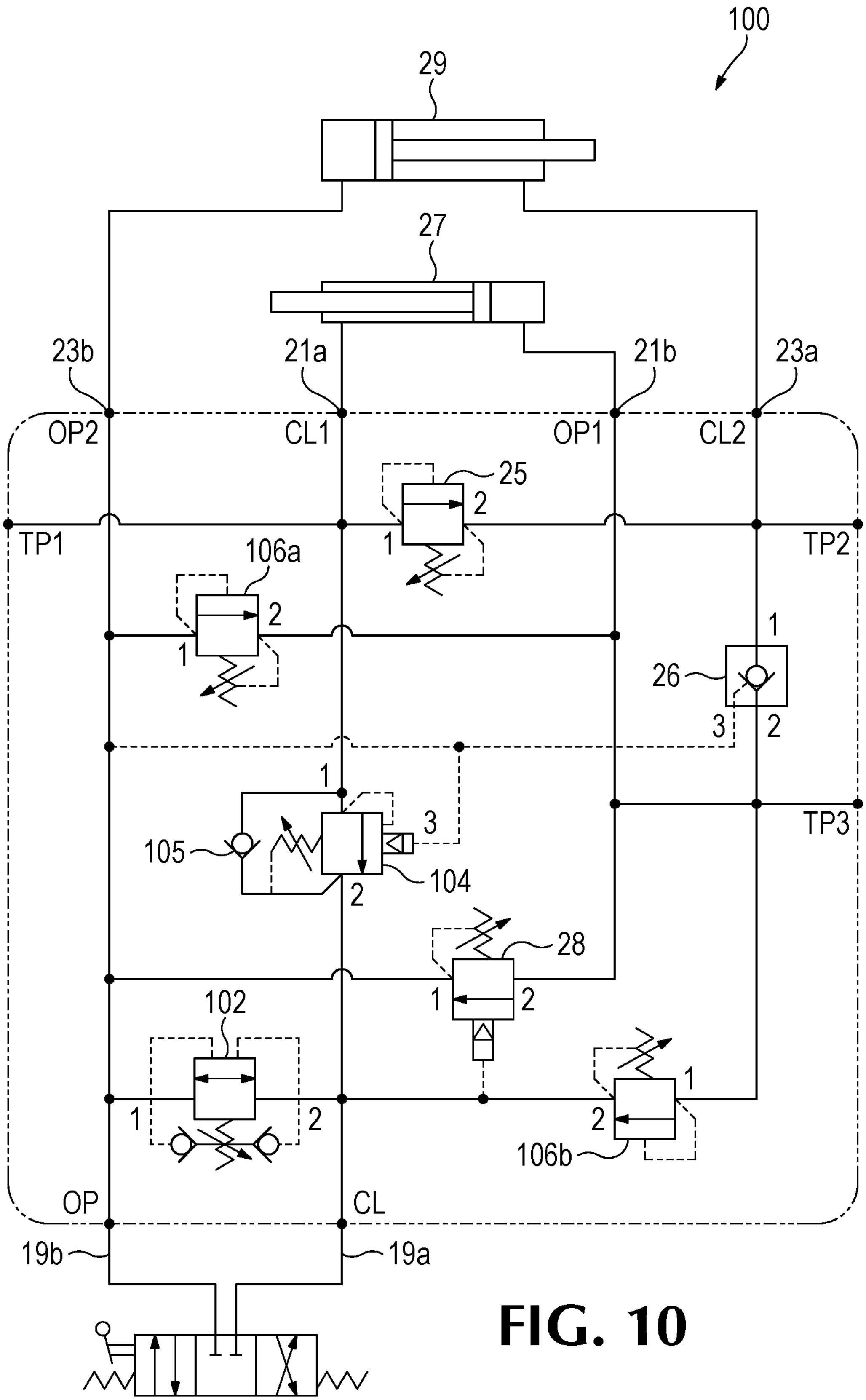
FIG. 10 shows an alternate control circuit using a bidirectional relief valve and a plurality of sequence valves that resynchronize hydraulic cylinders in an open position.

FIG. 10 shows a control circuit 100 that is an alternate embodiment of that shown in FIG. 3. The control circuit 100 may optionally include a bidirectional relief valve 102 to limit pressure during closing and opening of the 27 and 29, to protect against structural damage to itself or surrounding objects. Furthermore, in the control circuit of FIG. 3, there is a possibility that the pilot-operated check valve 26 opens before check valve 24, causing an intensification on port 1 of valve 24, which could exceed the available pilot pressure to open valve 24. To address this possibility, the control circuit 100 replaces the pilot-operated check valve 24 shown in FIG. 3 with a counterbalance valve 104. During closing operations, pressure through port 19*a* causes fluid to bypass the counterbalance valve 104 via check valve 105 and thereafter pressurize the rod-side of cylinder 27. During closing operations, pressure through port 19*b* opens pilot operated control valve 26 and also opens the counterbalance valve 104 to thereby allow fluid to exhaust through port 19*a*.

FIG. 10 also shows a relief valve 106*a* and a relief valve 106*b* that together allow resynchronization of the cylinders 27 and 29. Specifically, during an opening operation, if the cylinder 29 reaches its end of stroke before cylinder 27, relief valve 106*a* will open and allow fluid to enter the piston side of cylinder 27. Conversely, if the cylinder 27 reaches its end of stroke before cylinder 29, relief valve 106*b* will open and allow fluid to discharge from the rod side of cylinder 29.

Figure 11A:
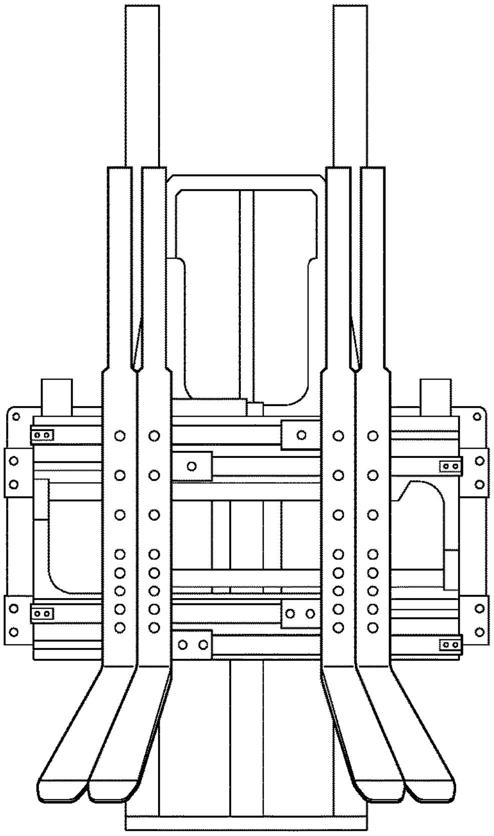
FIGS. 11A and 11B show a Multi-Load Handler (MLH) attachment in a single pallet mode and a double pallet mode, respectively.
Figure 11B:
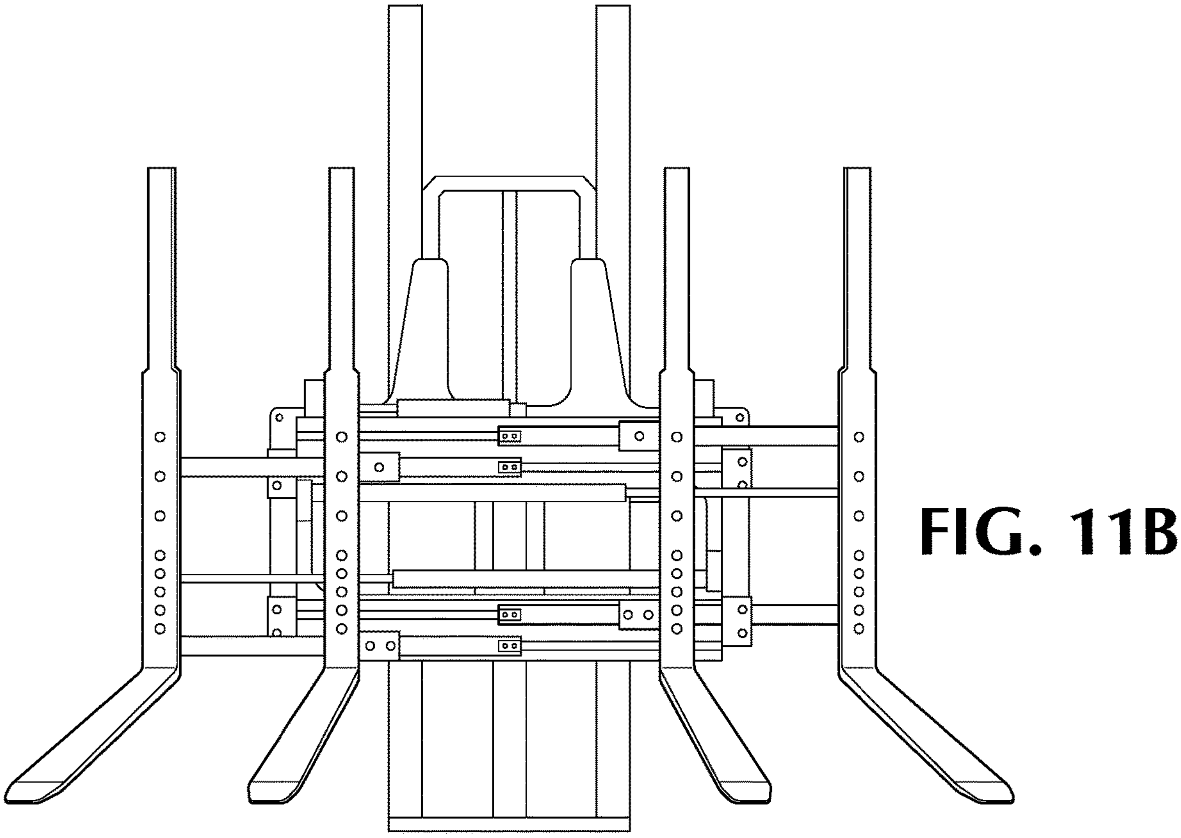

Referring to FIGS. 11A and 11B, a Multiple Load Handler (MLH) is a type of lift truck attachment that includes four forks laterally slidable relative to each other to allow a lift truck to alternately engage one or two palletized loads. In a first configuration shown in FIG. 11A, the four forks may be divided into two pairs of adjacent forks such that each pair may slide into a respective aperture of a single pallet. The second configuration, shown in FIG. 11B, arranged the forks into two pairs of spaced apart forks, where each pair is arranged to engage and move a respective pallet.

Figure 12A:
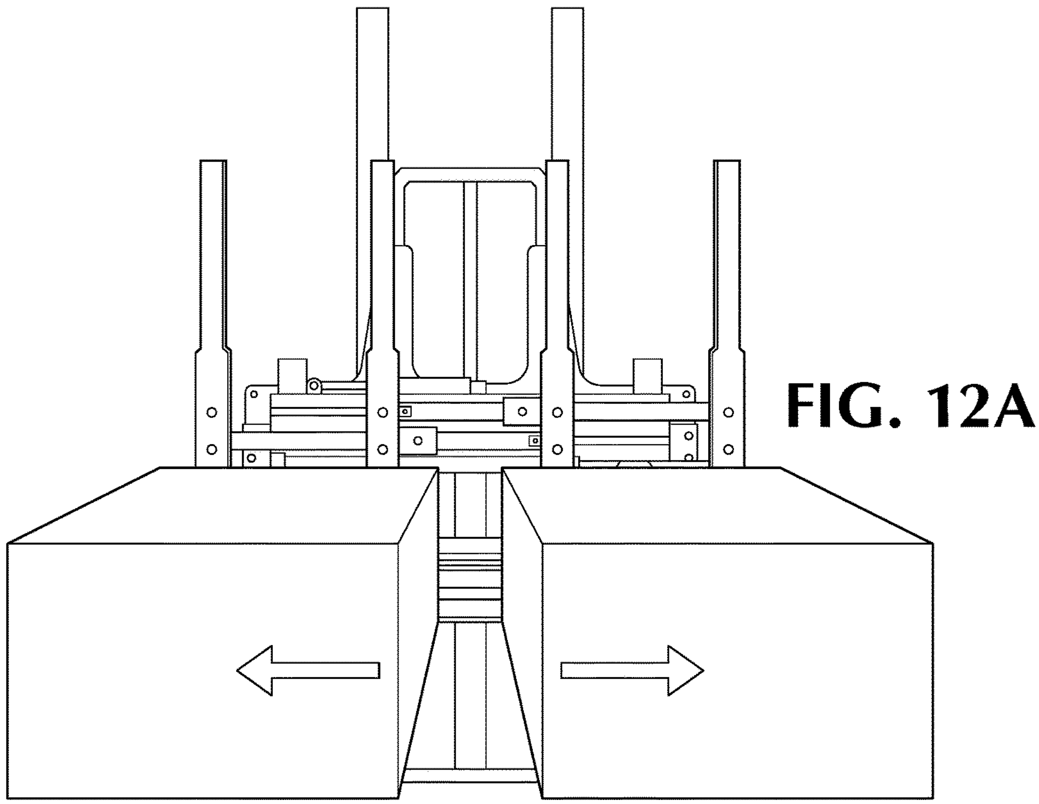
FIGS. 12A and 12B show operations of an MLH, when in a double pallet mode, that move loads away from, and towards each other respectively.
Figure 12B:
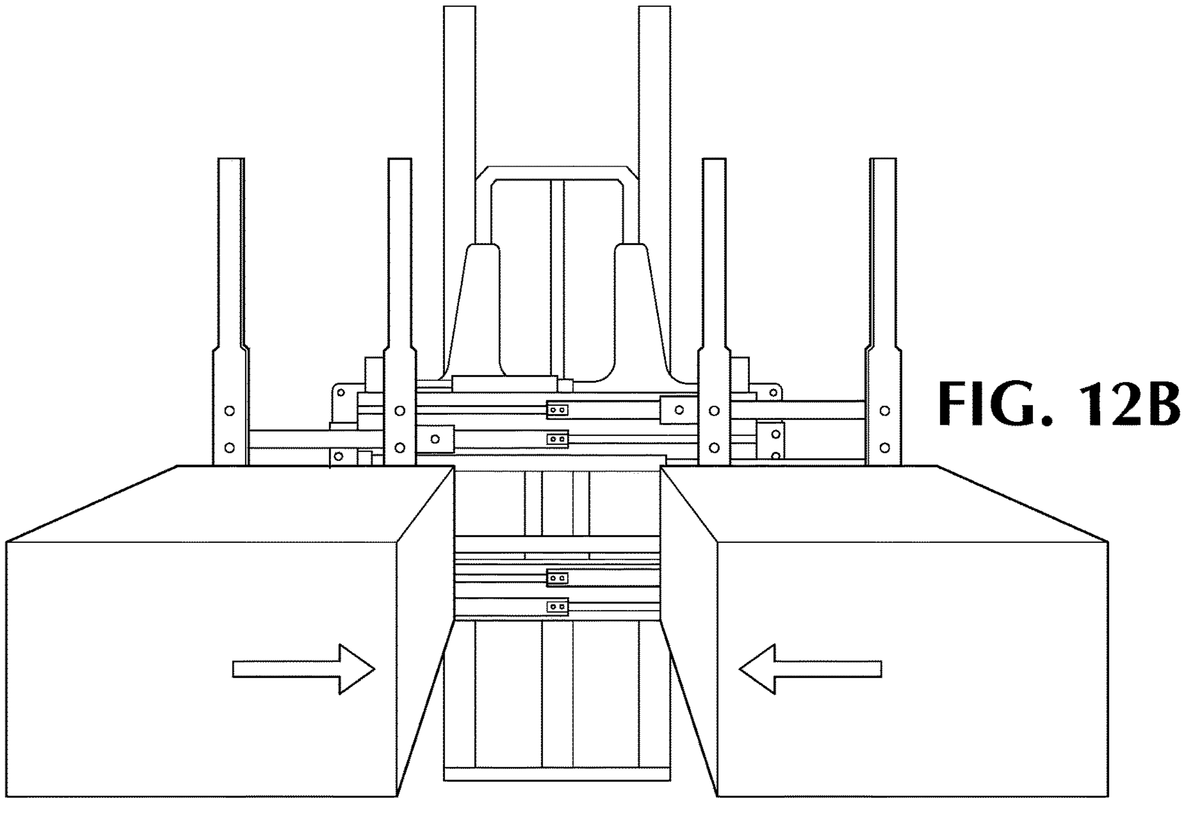

Thus, an MLH has two different operations to laterally position forks. The first operation is to position the forks between "single" and "double" pallet modes as shown in FIGS. 11A and 11B. This operation requires little actuator force, and preferably occurs at high speed with accurate synchronization between the two different pairs of forks. The second operation, which occurs in "double" mode, positioning each set of forks laterally relative to each other as shown in FIGS. 12A and 12B. This is commonly referred to as "snapping" when closing and "spreading" when opening. This operation requires high actuator force and low speed, again preferably with accurate synchronization between the left hand and right-hand fork sets.

Because the MLH modes of operation operate between a first mode characterized by high speed and low force and a second mode characterized by low speed and high force, it is desirable to employ a hybrid clamp force control circuit, as previously described. However, unlike the systems previously described where the high force operation occurs when clamping around a single load, and synchronization of movement between hydraulic cylinders during clamping therefore occurs through the transfer of force through the load, in an MLH attachment each cylinder is moving an independent load, hence the control circuit must also provide for synchronization between the cylinders. This is particularly true when cylinders of different bores are used, since the same pressure would produce different forces in the cylinders, leading to different movement speeds.

Figure 13:
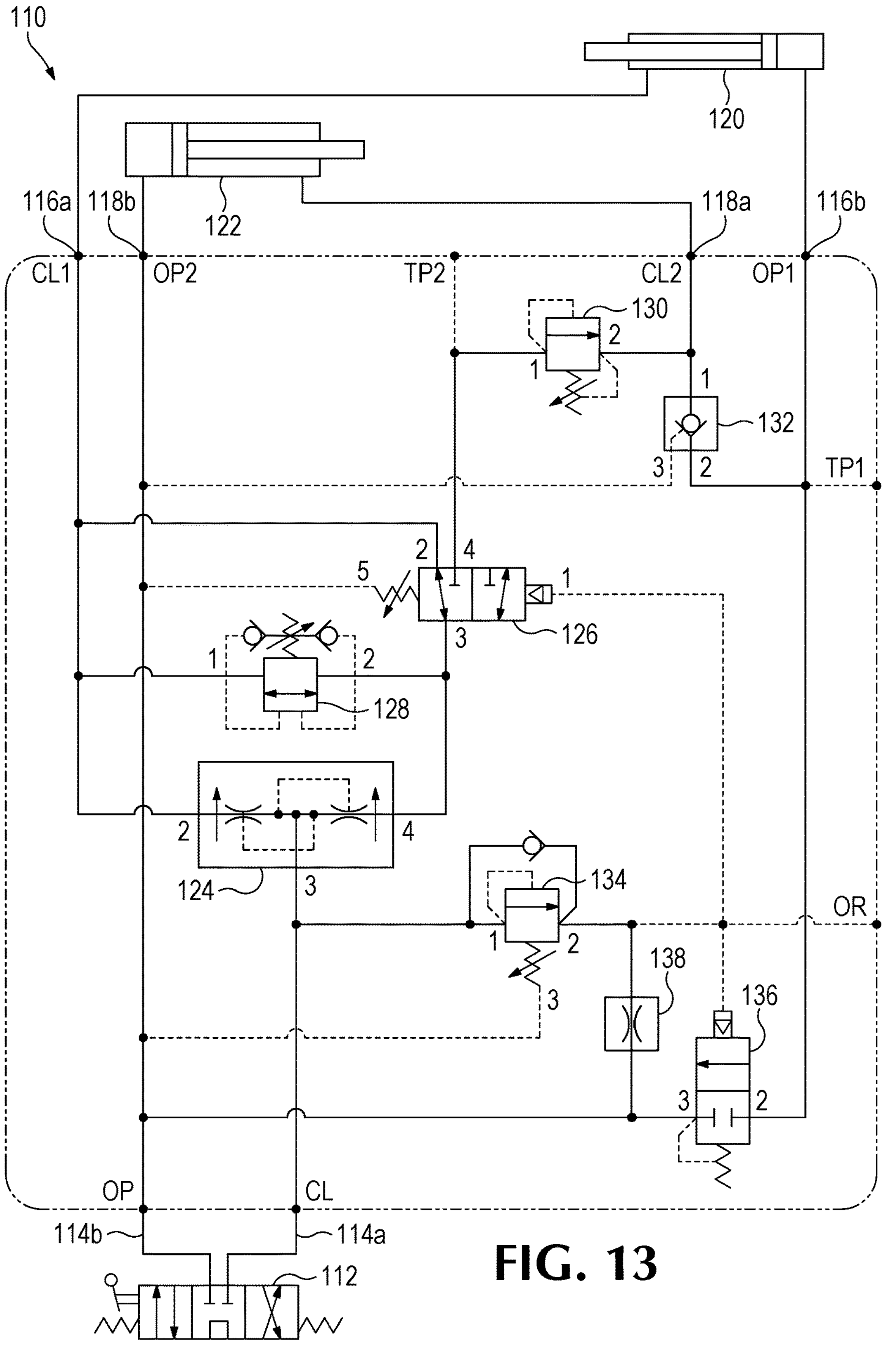
FIG. 13 shows an exemplary hydraulic control circuit that may be used to control an MLH.

FIG. 13 shows a control circuit 110 that receives and discharges fluid from inlet port 114*a*, 114*b* and receives and discharges fluid through a first outlet port 116*a*, 116*b* and a second output port 118*a*, 118*b*. FIG. 13 shows the first outlet port 116*a*, 116*b* connected to small bore cylinder 120 and the second outlet port 118*a*, 118*b* connected to large bore cylinder 122, but those of ordinary skill in the art will understand that this configuration may be reversed.

During high speed, low force operation of an MLH attachment, such as when forks are being positioned between double and single pallet modes, the cylinders may be operated in either of a closing movement or an opening movement. In the opening movement, a selector valve 112 may be moved to pressurize connection 114*a*, which provides fluid to a flow divider 124. One side of the flow divider is directly connected to connection 116*a* which supplies the rod side of the small bore cylinder 120, while the other side of the flow divider is connected to a pilot-operated directional control valve 126, which has a spring bias that sets it to a default position in low force operation that also supplies fluid to connection 116*a* of the rod side of the small bore cylinder 120, i.e. in low force operation, all the fluid in the flow divider exits connection 116*a* into the rod side of cylinder 120, which contracts to expel fluid back into the control circuit 110 through connection 116*b*. Pressurized fluid opens pilot-operated control valve 132 so that the pressurized fluid again exits the control circuit into the rod-side of large bore cylinder 122, which contracts to expel fluid into the control circuit through connection 118*b*, and then out of the control circuit 110 through inlet connection 114*a*. In this manner, during high-speed low force operation the cylinders 120 and 122 are linked so that the output of one cylinder provides fluid to the input of another cylinder.

During closing movement of a high force, low speed operation however, such as when loaded pallets are snapped towards each other, this linkage is broken and the control circuit operated in non-linked mode. Specifically, when the selector valve 112 is again set to pressurize connection 114*a*, but with loaded pallets being moved by the cylinders 120, 122, sequence valve 134 opens, thus pressurizing the pilot line to port 1 of the pilot-operated directional control valve 126. Valve 126 therefore moves to a position where a portion of the flow through flow divider 124, instead of being directed to output connection 116*a* is instead directed to output connection 118*a* so that each cylinder 120, 122 is driven independently. Simultaneously, pilot line to port 1 of sequence valve 136 is also pressurized by actuation of valve 134, which allows fluid to exhaust from cylinder 120, into connection 116*b* and out connection 114*b*. In some embodiments, the setting of sequence valve 114 may be approximately 2000 psi.

Flow divider 124 divides and recombines flow at the ratio equivalent to the difference in size between the cylinders 120 and 122. For example, a primary (small) actuator with bore size of 40 mm and rod size of 25 mm has a rod side working area of 766 mm^2, the corresponding secondary (large) actuator has a bore size of 50 mm and rod size of 30 mm has a rod side working area of 1257 mm^2. The flow divider should therefore preferably divide 38% of the flow to the primary (small) actuator and 62% of the flow to the secondary (large) actuator to achieve synchronized movement per the equations below:

$$\text{Primary Actuator} = \text{Volume 1} = A1 * \text{Stroke}$$
$$\text{Secondary Actuator} = \text{Volume 3} = A3 * \text{Stroke}$$
$$\text{Total Volume} = \text{Volume 1} + \text{Volume 3}$$
$$\text{Flow Divider} = \text{Specifications}$$
$$\text{Port 2 Division} = \frac{\text{Volume 1}}{\text{Total Volume}} = \frac{766 * \text{stroke}}{(766 + 1257) * \text{stroke}} = 38\%$$
$$\text{Port 4 Division} = \frac{\text{Volume 3}}{\text{Total Volume}} = \frac{1257 * \text{stroke}}{(766 + 1257) * \text{stroke}} = 62\%$$

As noted earlier, given that each cylinder is moving an independent load, and given that cylinders 120 and 122 have different bore sizes, the control circuit 110 preferably includes a synchronization mechanism that ensures that the cylinders 120 and 122 move at the same speed. Accordingly, the control circuit 110 preferably includes an intensifier relief valve 130 positioned between direction control valve 126 and output port 118*a*. Intensifier relief valve 130 provides a pressure drop due to the work of the fluid against the spring of valve 130, where the spring resistance is set so that the force applied by the large bore cylinder is the same as the small bore cylinder. In this manner, the two cylinders 120 and 122 move at the same speed. For example, assuming the cylinder 120 has a 40 mm bore with a 25 mm rod, and cylinder 122 has a bore of 50 mm and a 30 mm rod), and equal loads are carried on both pallets, a load that requires 2200 psi on the small bore would only require 1400 psi to achieve equal force. Thus valve 130 would be set to 800 psi to compensate for the difference and thereby allow the flow divider to operate more precisely. In some embodiments the intensifier relief valve may have a variable setting to accommodate different loads, different cylinders, and/or different configurations. Preferably, the spring force of valve 130 is set low enough so that whenever the system switches to non-linked mode, the valve 130 will open against the spring, i.e. sequence valve 134 has a higher spring resistance than the intensifier relief valve 130 such that any pressure in at port 114*a* large enough to actuate valve 126 will be large enough to actuate valve 130.

During opening movement, selector valve may pressurize connection 114*b*, which provides all pressurized fluid to port 118*b*, which operates the control circuit in linked mode. Because port 114*b* is pressurized, the pilot line to port 3 of pilot operated control valve 132 causes each to open so that fluid from cylinder 122 can flow into cylinder 120, and fluid from cylinder 120 can flow back to port 114*a* through flow divider 124.

In some embodiments, the control circuit 110 may include a cross-over relief valve 128 across the output of the flow divider 124. When in linked mode the cross-over relief valve has no effect on the control circuit 110, but when in non-linked mode the cross-over relief will open when the pressure differential exceeds the setting of the valve 124. This will allow flow to bypass the flow divider and resynchronize the when the forks are at the full closed position.

In some embodiments, the control circuit 110 may include a pilot drain orifice 138 that drains any trapped pressure in the pilot portion of the circuit, as well as normalizes the pressure between the pilot ports of sequence valve 136 and the direction control valve 126 to maintain the normal state of both. When the inlet pressure exceeds that of the setting of the sequence valve 134, that valve will open and allow flow/pressure to pilot the sequence valve 136 and the direction control valve 126. The orifice is sized such that is cannot drain the pressure faster than what sequence valve 134 can supply.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A hydraulic control circuit comprising:

an input port configured to receive pressurized fluid from a pump and return unpressurized fluid to a reservoir;

a first output port connectable to a first hydraulic actuator and a second output port connectable to a second hydraulic actuator, each of the first output port and the second output port configured to receive pressurized fluid from the input port and also configured to simultaneously deliver said pressurized fluid to its respectively connected hydraulic actuator and receive fluid discharged therefrom; and a selector capable of selectively causing any fluid discharged into the first output port to be delivered from the second output port; wherein the first output port and the second output port are each configured to deliver said pressurized fluid from the input port to a respectively connected hydraulic actuator regardless of whether the selector causes fluid discharged into the first output port to be delivered from the second output port.

2. The hydraulic control circuit of claim 1 where the selector selectively causes fluid discharged from the first hydraulic actuator to pressurize fluid delivered into the second hydraulic actuator automatically based upon the magnitude of fluid pressure provided to the hydraulic control circuit.

3. The hydraulic control circuit of claim 1 where the selector selectively causes fluid discharged from the first hydraulic actuator to pressurize fluid delivered into the second hydraulic actuator automatically based upon which connection of an input port receives pressurized fluid.

4. The hydraulic control circuit of claim 1 selectively connectable to a lift truck attachment having opposed clamps, where the selector is configured to selectively cause fluid discharged from the first hydraulic actuator to pressurize fluid delivered into the second hydraulic actuator automatically when the clamps engage a load.

5. The hydraulic control circuit of claim 1 where the selector selectively causes fluid discharged from the first hydraulic actuator to pressurize fluid delivered into the second hydraulic actuator automatically during an opening movement of the hydraulic actuators.

6. The hydraulic control circuit of claim 1 where the selector selectively causes fluid discharged from the first hydraulic actuator to pressurize fluid delivered into the second hydraulic actuator automatically during a portion of a closing movement of the hydraulic actuators and during an opening movement of the hydraulic actuators.

7. The hydraulic control circuit of claim 1 where the selector alternates the control circuit between a first mode where the hydraulic actuators are linked in series and a second mode where the hydraulic actuators are not linked in series.

8. The hydraulic control circuit of claim 7 where in the second mode, the hydraulic actuators are driven in parallel.

9. The hydraulic control circuit of claim 8 including a second selector that controls the flow from a flow divider.

10. The hydraulic control circuit of claim 7 where in the second mode, one hydraulic actuator is moved by the control circuit while the other hydraulic actuator is prevented from moving by the control circuit.

11. A hydraulic control circuit connected to first hydraulic actuator and a second hydraulic actuator, the first hydraulic actuator having a head side area equal to the rod side area of the second hydraulic actuator, the hydraulic control circuit comprising:

an input port configured to receive pressurized fluid from a pump and return unpressurized fluid to a reservoir;

a first output port connectable to the first hydraulic actuator and a second output port connectable to the second hydraulic actuator, each of the first output port and the second output port configured to receive pressurized fluid from the input port and also configured to simultaneously deliver said pressurized fluid to its respectively connected hydraulic actuator and receive fluid discharged therefrom; and a selector capable of selectively causing fluid discharged from the first hydraulic actuator to be delivered into the second hydraulic actuator; wherein the first output port and the second output port each deliver said pressurized fluid to the first hydraulic actuator and the second hydraulic actuator, respectively, to achieve synchronous extension and retraction movement of the first hydraulic actuator and the second hydraulic actuator.

12. The hydraulic control circuit of claim 11 where the selector selectively causes fluid discharged from the first hydraulic actuator to pressurize fluid delivered into the second hydraulic actuator automatically based upon the magnitude of fluid pressure provided to the hydraulic control circuit.

13. The hydraulic control circuit of claim 11 where the selector selectively causes fluid discharged from the first hydraulic actuator to pressurize fluid delivered into the second hydraulic actuator automatically based upon which connection of an input port receives pressurized fluid.

14. The hydraulic control circuit of claim 11 selectively connectable to a lift truck attachment having opposed clamps, where the selector is configured to selectively cause fluid discharged from the first hydraulic actuator to pressurize fluid delivered into the second hydraulic actuator automatically when the clamps engage a load.

15. The hydraulic control circuit of claim 11 where the selector selectively causes fluid discharged from the first hydraulic actuator to pressurize fluid delivered into the second hydraulic actuator automatically during an opening movement of the hydraulic actuators.

16. The hydraulic control circuit of claim 11 where the selector selectively causes fluid discharged from the first hydraulic actuator to pressurize fluid delivered into the second hydraulic actuator automatically during a portion of a closing movement of the hydraulic actuators and during an opening movement of the hydraulic actuators.

17. The hydraulic control circuit of claim 11 where the selector alternates the control circuit between a first mode where the hydraulic actuators are linked in series and a second mode where the hydraulic actuators are not linked in series.

18. The hydraulic control circuit of claim 17 where in the second mode, the hydraulic actuators are driven in parallel.

19. The hydraulic control circuit of claim 18 including a second selector that controls the flow from a flow divider.

20. The hydraulic control circuit of claim 17 where in the second mode, one hydraulic actuator is moved by the control circuit while the other hydraulic actuator is prevented from moving by the control circuit.

* * * * *